United States Patent
Zhang et al.

(10) Patent No.: US 11,909,691 B2
(45) Date of Patent: Feb. 20, 2024

(54) ON-DEMAND NEGATIVE ACKNOWLEDGMENT RESOURCE REQUEST

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/518,167

(22) Filed: Nov. 3, 2021

(65) Prior Publication Data

US 2022/0150029 A1 May 12, 2022

Related U.S. Application Data

(60) Provisional application No. 63/110,769, filed on Nov. 6, 2020.

(51) Int. Cl.
*H04L 5/00* (2006.01)

(52) U.S. Cl.
CPC .................... *H04L 5/0055* (2013.01)

(58) Field of Classification Search
CPC ................ H04L 5/0055; H04L 1/1861
USPC ........................................... 370/329
See application file for complete search history.

(56) References Cited

U.S. PATENT DOCUMENTS

| | | | |
|---|---|---|---|
| 2016/0105860 A1* | 4/2016 | Li | H04W 72/30 370/350 |
| 2019/0090279 A1* | 3/2019 | Sun | H04W 28/26 |
| 2021/0050895 A1* | 2/2021 | Kang | H04B 7/0639 |

* cited by examiner

*Primary Examiner* — Mang Hang Yeung
(74) *Attorney, Agent, or Firm* — Holland & Hart LLP

(57) ABSTRACT

Methods, systems, and devices for wireless communications are described. Generally, the described techniques provide for reducing the overhead associated with reporting feedback, such as hybrid automatic repeat request (HARQ) feedback. A user equipment (UE) may receive a configuration message from a base station indicating that the UE is to request resources for transmitting negative acknowledgment (NACK) feedback for a downlink transmission. If the UE fails to receive or decode the downlink transmission, the UE may request resources from the base station on which to transmit the NACK feedback for the downlink transmission. Because the UE may be configured to request resources on which to transmit the NACK feedback, the UE may avoid transmitting HARQ feedback for every downlink transmission from the base station. Thus, the base station may avoid allocating resources for HARQ feedback from the UE for every downlink transmission, and the overhead of reporting HARQ feedback is reduced.

30 Claims, 13 Drawing Sheets

ON-DEMAND NEGATIVE ACKNOWLEDGMENT RESOURCE REQUEST

CROSS REFERENCE

The present Application for Patent claims the benefit of U.S. Provisional Patent Application No. 63/110,769 by ZHANG et al., entitled "ON-DEMAND NEGATIVE ACKNOWLEDGMENT RESOURCE REQUEST," filed Nov. 6, 2020, assigned to the assignee hereof, and expressly incorporated by reference herein.

FIELD OF TECHNOLOGY

The following relates to wireless communications, including on-demand negative acknowledgment (NACK) resource requests.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

SUMMARY

The described techniques relate to improved methods, systems, devices, and apparatuses that support on-demand negative acknowledgment (NACK) resource requests. Generally, the described techniques provide for reducing the overhead associated with reporting various feedback, such as hybrid automatic repeat request (HARQ) feedback. A user equipment (UE) may receive an indication of a configuration from a base station indicating that the UE is to request resources for transmitting NACK feedback for a downlink transmission. Accordingly, if the UE fails to receive or decode the downlink transmission, the UE may request resources from the base station on which to transmit the NACK feedback for the downlink transmission. Because the UE may be configured to request resources on which to transmit the NACK feedback, the UE may avoid transmitting HARQ feedback for every downlink transmission from the base station. Thus, the base station may avoid allocating resources for HARQ feedback from the UE for every downlink transmission, and the overhead of reporting HARQ feedback may be relatively reduced.

A method for wireless communication at a UE is described. The method may include receiving, from a base station, a configuration message indicating that the UE is to request resources for transmitting negative acknowledgment feedback to the base station for a downlink transmission, attempting to decode the downlink transmission from the base station, determining to transmit the negative acknowledgment feedback to the base station for the downlink transmission based on receiving the configuration message and attempting to decode the downlink transmission, and transmitting, to the base station, a request for resources for transmitting the negative acknowledgment feedback based on determining to transmit the negative acknowledgment feedback.

An apparatus for wireless communication at a UE is described. The apparatus may include a processor, memory in electronic communication with the processor, and instructions stored in the memory. The instructions may be executable by the processor to cause the apparatus to receive, from a base station, a configuration message indicating that the UE is to request resources for transmitting negative acknowledgment feedback to the base station for a downlink transmission, attempt to decode the downlink transmission from the base station, determine to transmit the negative acknowledgment feedback to the base station for the downlink transmission based on receiving the configuration message and attempting to decode the downlink transmission, and transmit, to the base station, a request for resources for transmitting the negative acknowledgment feedback based on determining to transmit the negative acknowledgment feedback.

Another apparatus for wireless communication at a UE is described. The apparatus may include means for receiving, from a base station, a configuration message indicating that the UE is to request resources for transmitting negative acknowledgment feedback to the base station for a downlink transmission, means for attempting to decode the downlink transmission from the base station, means for determining to transmit the negative acknowledgment feedback to the base station for the downlink transmission based on receiving the configuration message and attempting to decode the downlink transmission, and means for transmitting, to the base station, a request for resources for transmitting the negative acknowledgment feedback based on determining to transmit the negative acknowledgment feedback.

A non-transitory computer-readable medium storing code for wireless communication at a UE is described. The code may include instructions executable by a processor to receive, from a base station, a configuration message indicating that the UE is to request resources for transmitting negative acknowledgment feedback to the base station for a downlink transmission, attempt to decode the downlink transmission from the base station, determine to transmit the negative acknowledgment feedback to the base station for the downlink transmission based on receiving the configuration message and attempting to decode the downlink transmission, and transmit, to the base station, a request for resources for transmitting the negative acknowledgment feedback based on determining to transmit the negative acknowledgment feedback.

Some examples of the method, apparatuses, and non-transitory computer-readable medium described herein may further include operations, features, means, or instructions for receiving, from the base station, an indication of resources allocated for transmitting the negative acknowledgment feedback based on transmitting the request for resources and transmitting the negative acknowledgment feedback to the base station on the indicated resources.

In some examples of the method, apparatuses, and non-transitory computer-readable medium described herein, receiving the configuration message indicating that the UE may be to request resources for transmitting the negative acknowledgment feedback to the base station may include operations, features, means, or instructions for receiving, in the configuration message, an indication of all or a subset of semi-persistent scheduling downlink transmissions for which the UE may be to request resources for transmitting the negative acknowledgment feedback to the base station.

In some examples of the method, apparatuses, and non-transitory computer-readable medium described herein, receiving the configuration message indicating that the UE may be to request resources for transmitting the negative acknowledgment feedback to the base station may include operations, features, means, or instructions for receiving, in the configuration message, an indication of all or a subset of downlink hybrid automatic repeat request identifiers associated with downlink transmissions for which the UE may be to request resources for transmitting the negative acknowledgment feedback to the base station.

In some examples of the method, apparatuses, and non-transitory computer-readable medium described herein, receiving the configuration message indicating that the UE may be to request resources for transmitting the negative acknowledgment feedback to the base station may include operations, features, means, or instructions for receiving, in the configuration message, an indication of one or more downlink control information scheduled downlink transmissions for which the UE may be to request resources for transmitting the negative acknowledgment feedback to the base station.

In some examples of the method, apparatuses, and non-transitory computer-readable medium described herein, determining to transmit the negative acknowledgment feedback to the base station for the downlink transmission may include operations, features, means, or instructions for determining that an acknowledgment or negative acknowledgment codebook for the downlink transmission includes at least one negative acknowledgment.

In some examples of the method, apparatuses, and non-transitory computer-readable medium described herein, determining to transmit the negative acknowledgment feedback to the base station for the downlink transmission may include operations, features, means, or instructions for determining that an acknowledgment or negative acknowledgment feedback bit for a hybrid automatic repeat request identifier corresponding to the downlink transmission includes a negative acknowledgment.

In some examples of the method, apparatuses, and non-transitory computer-readable medium described herein, transmitting the request for resources for transmitting the negative acknowledgment feedback may include operations, features, means, or instructions for transmitting a scheduling request including the request for resources for transmitting the negative acknowledgment feedback.

In some examples of the method, apparatuses, and non-transitory computer-readable medium described herein, transmitting the request for resources for transmitting the negative acknowledgment feedback may include operations, features, means, or instructions for transmitting the request for resources for transmitting the negative acknowledgment feedback on an acknowledgment or negative acknowledgment feedback resource for a second downlink transmission.

In some examples of the method, apparatuses, and non-transitory computer-readable medium described herein, transmitting the request for resources for transmitting the negative acknowledgment feedback may include operations, features, means, or instructions for transmitting the request for resources for transmitting the negative acknowledgment feedback in uplink control information or a medium access control control element of an existing allocation.

In some examples of the method, apparatuses, and non-transitory computer-readable medium described herein, transmitting the request for resources for transmitting the negative acknowledgment feedback may include operations, features, means, or instructions for transmitting the request for resources for transmitting the negative acknowledgment feedback on dedicated resources for the request allocated to the UE or a group of UEs including the UE.

In some examples of the method, apparatuses, and non-transitory computer-readable medium described herein, transmitting the request for resources for transmitting the negative acknowledgment feedback may include operations, features, means, or instructions for transmitting the request for resources for transmitting the negative acknowledgment feedback on contention-based resources for the request.

Some examples of the method, apparatuses, and non-transitory computer-readable medium described herein may further include operations, features, means, or instructions for receiving an indication of resources or a message in which the UE may be to transmit the request for resources for transmitting the negative acknowledgment feedback.

Some examples of the method, apparatuses, and non-transitory computer-readable medium described herein may further include operations, features, means, or instructions for transmitting the negative acknowledgment feedback associated with a corresponding acknowledgment or negative acknowledgment codebook or downlink hybrid automatic repeat request identifier containing at least one negative acknowledgment bit to the base station on resources allocated based on the request for resources.

In some examples of the method, apparatuses, and non-transitory computer-readable medium described herein, the configuration message may be received in a radio resource control message, a medium access control control element, or a downlink control information message.

A method for wireless communication at a base station is described. The method may include transmitting, to a UE, a configuration message indicating that the UE is to request resources for transmitting negative acknowledgment feedback to the base station for a downlink transmission, transmitting the downlink transmission to the UE, receiving, from the UE based on transmitting the configuration message and on transmitting the downlink transmission, a request for resources to be used by the UE to transmit the negative acknowledgment feedback for the downlink transmission, and transmitting, to the UE based on receiving the request, an indication of resources allocated for transmitting the negative acknowledgment feedback.

An apparatus for wireless communication at a base station is described. The apparatus may include a processor, memory in electronic communication with the processor, and instructions stored in the memory. The instructions may be executable by the processor to cause the apparatus to transmit, to a UE, a configuration message indicating that the UE is to request resources for transmitting negative acknowledgment feedback to the base station for a downlink transmission, transmit the downlink transmission to the UE, receive, from the UE based on transmitting the configuration message and on transmitting the downlink transmission, a request for resources to be used by the UE to transmit the negative acknowledgment feedback for the downlink transmission, and transmit, to the UE based on receiving the request, an indication of resources allocated for transmitting the negative acknowledgment feedback.

Another apparatus for wireless communication at a base station is described. The apparatus may include means for transmitting, to a UE, a configuration message indicating that the UE is to request resources for transmitting negative acknowledgment feedback to the base station for a downlink transmission, means for transmitting the downlink transmission to the UE, means for receiving, from the UE based on transmitting the configuration message and on transmitting the downlink transmission, a request for resources to be used by the UE to transmit the negative acknowledgment feedback for the downlink transmission, and means for transmitting, to the UE based on receiving the request, an indication of resources allocated for transmitting the negative acknowledgment feedback.

A non-transitory computer-readable medium storing code for wireless communication at a base station is described. The code may include instructions executable by a processor to transmit, to a UE, a configuration message indicating that the UE is to request resources for transmitting negative acknowledgment feedback to the base station for a downlink transmission, transmit the downlink transmission to the UE, receive, from the UE based on transmitting the configuration message and on transmitting the downlink transmission, a request for resources to be used by the UE to transmit the negative acknowledgment feedback for the downlink transmission, and transmit, to the UE based on receiving the request, an indication of resources allocated for transmitting the negative acknowledgment feedback.

Some examples of the method, apparatuses, and non-transitory computer-readable medium described herein may further include operations, features, means, or instructions for receiving the negative acknowledgment feedback from the UE on the indicated resources based on transmitting the indication of resources.

In some examples of the method, apparatuses, and non-transitory computer-readable medium described herein, transmitting the configuration message indicating that the UE may be to request resources for transmitting the negative acknowledgment feedback to the base station may include operations, features, means, or instructions for transmitting, in the configuration message, an indication of all or a subset of semi-persistent scheduling downlink transmissions for which the UE may be to request resources for transmitting the negative acknowledgment feedback to the base station.

In some examples of the method, apparatuses, and non-transitory computer-readable medium described herein, transmitting the configuration message indicating that the UE may be to request resources for transmitting the negative acknowledgment feedback to the base station may include operations, features, means, or instructions for transmitting, in the configuration message, an indication of all or a subset of downlink hybrid automatic repeat request identifiers associated with downlink transmissions for which the UE may be to request resources for transmitting the negative acknowledgment feedback to the base station.

In some examples of the method, apparatuses, and non-transitory computer-readable medium described herein, transmitting the configuration message indicating that the UE may be to request resources for transmitting the negative acknowledgment feedback to the base station may include operations, features, means, or instructions for transmitting, in the configuration message, an indication of one or more downlink control information scheduled downlink transmissions for which the UE may be to request resources for transmitting the negative acknowledgment feedback to the base station.

In some examples of the method, apparatuses, and non-transitory computer-readable medium described herein, receiving the request for resources to be used by the UE to transmit the negative acknowledgment feedback may include operations, features, means, or instructions for receiving a scheduling request including the request for resources to be used by the UE to transmit the negative acknowledgment feedback.

In some examples of the method, apparatuses, and non-transitory computer-readable medium described herein, receiving the request for resources to be used by the UE to transmit the negative acknowledgment feedback may include operations, features, means, or instructions for receiving the request for resources to be used by the UE to transmit the negative acknowledgment feedback on an acknowledgment or negative acknowledgment feedback resource for a second downlink transmission.

In some examples of the method, apparatuses, and non-transitory computer-readable medium described herein, receiving the request for resources to be used by the UE to transmit the negative acknowledgment feedback may include operations, features, means, or instructions for receiving the request for resources to be used by the UE to transmit the negative acknowledgment feedback in uplink control information or a medium access control control element of an existing allocation.

In some examples of the method, apparatuses, and non-transitory computer-readable medium described herein, receiving the request for resources to be used by the UE to transmit the negative acknowledgment feedback may include operations, features, means, or instructions for receiving the request for resources to be used by the UE to transmit the negative acknowledgment feedback on dedicated resources for the request allocated to the UE or a group of UEs including the UE.

In some examples of the method, apparatuses, and non-transitory computer-readable medium described herein, receiving the request for resources to be used by the UE to transmit the negative acknowledgment feedback may include operations, features, means, or instructions for receiving the request for resources to be used by the UE to transmit the negative acknowledgment feedback on contention-based resources for the request.

Some examples of the method, apparatuses, and non-transitory computer-readable medium described herein may further include operations, features, means, or instructions for transmitting a second indication of resources or a message in which the UE may be to transmit the request for resources for transmitting the negative acknowledgment feedback.

Some examples of the method, apparatuses, and non-transitory computer-readable medium described herein may further include operations, features, means, or instructions for receiving the negative acknowledgment feedback associated with a corresponding acknowledgment or negative acknowledgment codebook or downlink hybrid automatic repeat request identifier containing at least one negative acknowledgment bit from the UE on resources allocated based on the request for resources.

In some examples of the method, apparatuses, and non-transitory computer-readable medium described herein, the configuration message may be transmitted in a radio resource control message, a medium access control control element, or a downlink control information message.

DETAILED DESCRIPTION

A wireless multiple-access communications system may include one or more base stations or one or more network access nodes, each simultaneously supporting communication for multiple communication devices, which may be otherwise known as user equipment (UE). In some wireless communications systems, a base station may transmit downlink data to a UE, and the UE may report feedback, such as hybrid automatic repeat request (HARQ) feedback, for the downlink data to the base station. The base station may then use the feedback, such as the HARQ feedback, to determine whether to schedule a retransmission of the downlink data to the UE (e.g., if the UE failed to receive or successfully decode the downlink data). The HARQ feedback may include an acknowledgment (ACK) or a negative ACK (NACK). An ACK may indicate that a UE successfully decoded downlink data from a base station, and the base station may avoid scheduling a retransmission of the downlink data to the UE. Alternatively, a NACK may indicate that the UE failed to decode the downlink data from the base station, and the base station may schedule a retransmission of the downlink data to the UE. In some cases, the base station may allocate resources for the UE to report HARQ feedback for every downlink transmission to the UE, and as a result, the overhead of reporting HARQ feedback may be relatively high.

As described herein, a wireless communications system may support efficient techniques for reducing the overhead associated with reporting HARQ feedback to a base station. A UE may receive an indication of a configuration from a base station indicating that the UE is to request resources for transmitting NACK feedback for a downlink transmission. Accordingly, if the UE fails to receive or decode the downlink transmission, the UE may request resources from the base station on which to transmit the NACK feedback for the downlink transmission. Because the UE may be configured to request resources on which to transmit the NACK feedback, the UE may avoid transmitting HARQ feedback for every downlink transmission from the base station. Thus, the base station may avoid allocating resources for HARQ feedback from the UE for every downlink transmission, and the overhead of reporting HARQ feedback may be relatively reduced.

Aspects of the disclosure introduced above are described herein in the context of a wireless communications system. Examples of processes and signaling exchanges that support on-demand NACK resource request are then described. Aspects of the disclosure are further illustrated by and described with reference to apparatus diagrams, system diagrams, and flowcharts that relate to on-demand NACK resource request.

Figure 1:
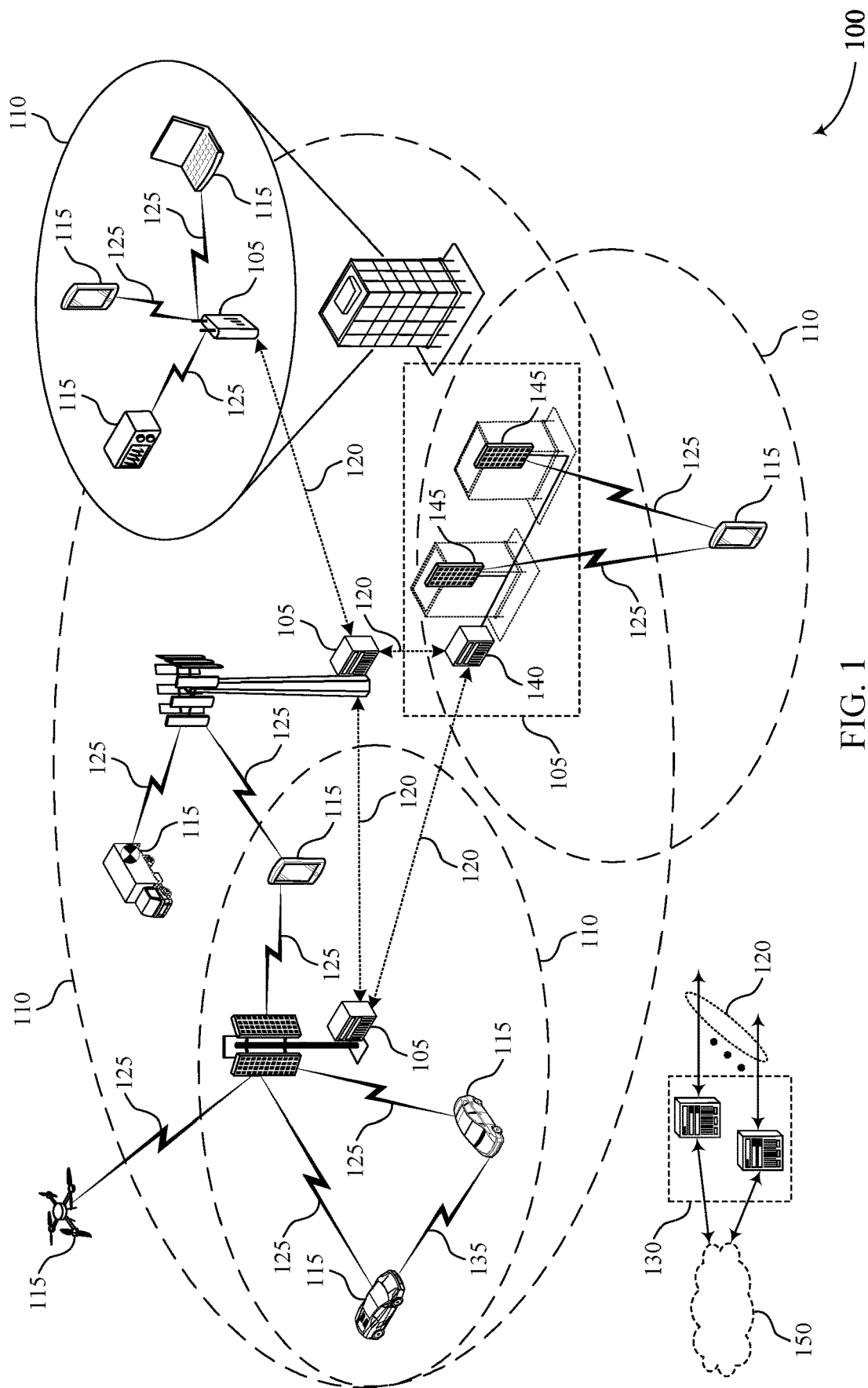
FIG. 1 illustrates an example of a wireless communications system that supports on-demand negative acknowledgment resource request in accordance with aspects of the present disclosure.

FIG. 1 illustrates an example of a wireless communications system 100 that supports on-demand negative acknowledgment resource request in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a later slot or according to some other time interval.

In wireless communications system 100, HARQ feedback may include an ACK indicating that a receiving device successfully decoded a transmission or a NACK indicating that a receiving device failed to decode a transmission. For instance, if a UE 115 reports an ACK to the base station 105 for downlink data, the base station 105 may determine that the UE 115 successfully received and decoded the downlink data, and the base station 105 may avoid scheduling a retransmission of the downlink data to the UE 115. Alternatively, if the UE 115 reports a NACK to the base station 105 for the downlink data, the base station 105 may determine that the UE 115 failed to receive or decode the downlink data, and the base station 105 may schedule a retransmission of the downlink data to the UE 115.

In some cases, the base station 105 may configure resources for the UE 115 to report feedback, such as HARQ feedback, for every downlink transmission to the UE 115. For instance, the base station 105 may assign a resource, such as a PUCCH resource, for ACK/NACK feedback for every PDSCH transmission. The PUCCH resource may be scheduled after a quantity of TTIs (e.g., K1 TTIs) following a PDSCH transmission, where the quantity of TTIs may be preconfigured or signaled to the UE 115. Because the UE 115 may be assigned resources for reporting HARQ feedback for every downlink transmission, the overhead of reporting HARQ feedback to the base station 105 using other different techniques may be relatively high. Wireless communications system 100 may support efficient techniques for reducing the overhead associated with reporting HARQ feedback.

Figure 2:
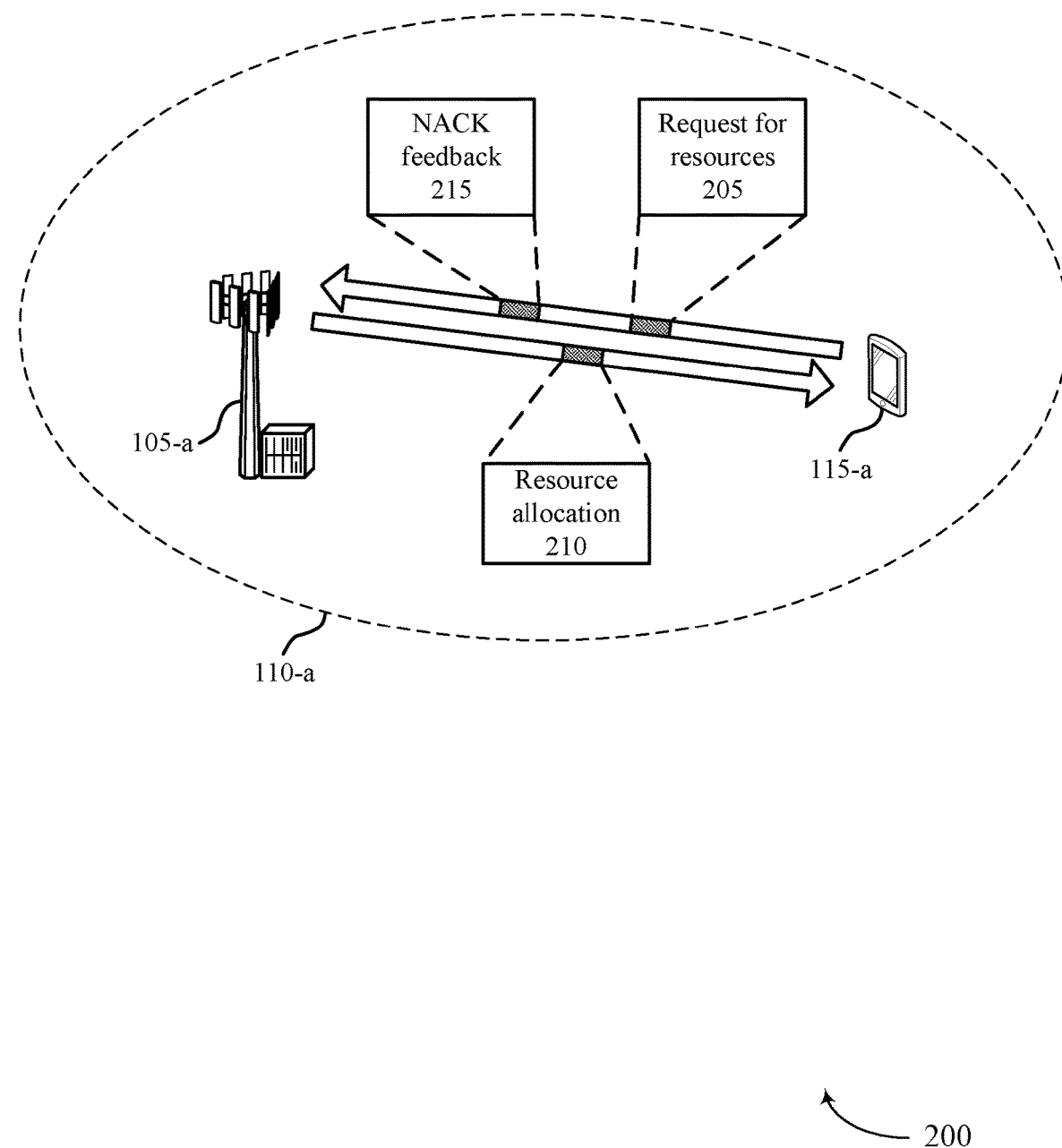
FIG. 2 illustrates an example of a wireless communications system that supports on-demand negative acknowledgment resource request in accordance with aspects of the present disclosure.

FIG. 2 illustrates an example of a wireless communications system 200 that supports on-demand negative acknowledgment resource request in accordance with aspects of the present disclosure. The wireless communications system 200 includes a UE 115-a, which may be an example of a UE 115 described with reference to FIG. 1. The wireless communications system 200 also includes a base station 105-a, which may be an example of a base station 105 described with reference to FIG. 1. The base station 105-a may provide communication coverage for a coverage area 110-a. The wireless communications system 200 may implement aspects of the wireless communications system 100. For example, the wireless communications system 200 may support efficient techniques for reducing the overhead associated with reporting feedback, such as HARQ feedback.

In wireless communications system 200, the UE 115-a may support on-demand NACK feedback, where the UE 115-a may request resources for transmitting NACK feedback to the base station 105-a. When the UE 115-a is configured for on-demand NACK feedback, the base station 105-a may avoid assigning a PUCCH resource for ACK/NACK feedback for all PDSCH transmissions to the UE 115-a. Instead, the UE 115-a may request resources for transmitting NACK feedback for some downlink transmissions. That is, in the case that the UE 115-a fails to decode a PDSCH (e.g., if at least one bit in an ACK/NACK codebook for the PDSCH is a NACK or the ACK/NACK bit for a downlink HARQ identifier (HARQ ID) associated with the PDSCH is a NACK), and the UE 115-*a* may be configured to transmit NACK feedback for the PDSCH, the UE 115-*a* may request an on-demand NACK PUCCH resource using certain uplink signaling. Then, the base station 105-*a* may allocate resources to the UE 115-*a* to transmit the NACK for the PDSCH, and the UE 115-*a* may transmit the NACK for the PDSCH on the resources allocated in response to the request.

The UE 115-*a* may receive a configuration message from the base station 105-*a* indicating one or more downlink transmissions for which the UE 115-*a* is to request resources for transmitting NACK feedback. That is, the configuration message may configure the UE 115-*a* to use on-demand NACK feedback for one or more downlink transmissions. The base station 105-*a* may transmit the configuration message to the UE 115-*a* in RRC signaling, in a MAC control element (MAC-CE), or in downlink control information (DCI).

In one example, the base station 105-*a* may configure a subset of or all semi-persistent scheduling (SPS) configurations for on-demand NACK feedback. In this example, the UE 115-*a* may request resources to use to transmit NACK feedback for each SPS downlink transmission linked to an SPS configuration for which on-demand NACK feedback is configured (e.g., if the UE 115-*a* fails to decode the SPS downlink transmission). In another example, the base station 105-*a* may configure a subset of or all downlink HARQ IDs for on-demand NACK feedback. In this example, the UE 115-*a* may request resources to use to transmit NACK feedback for each downlink transmission associated with a HARQ ID for which on-demand NACK feedback is configured (e.g., if the UE 115-*a* fails to decode the downlink transmission). In yet another example, the base station 105-*a* may configure an individual downlink transmission (e.g., PDSCH) scheduled using DCI for on-demand NACK feedback. In this example, the UE 115-*a* may request resources to use to transmit NACK feedback for the downlink transmission for which on-demand NACK feedback is configured (e.g., if the UE 115-*a* fails to decode the downlink transmission).

In some cases, although the UE 115-*a* may be configured to utilize on-demand NACK feedback for a PDSCH, the UE 115-*a* may still be configured with a K1 value indicating a PUCCH resource for reporting HARQ feedback for the PDSCH. In such cases, the PUCCH resource may be referred to as a virtual PUCCH resource. The virtual PUCCH resource may be configured the same as a current configured PUCCH resource for the purpose of ACK/NACK codebook computation since every PDSCH may have a K1 value to indicate which PUCCH resource is to carry a corresponding ACK/NACK bit. The UE 115-*a* may not be allowed to transmit the ACK/NACK codebook on the virtual PUCCH resource, but the time/frequency resources corresponding to the virtual PUCCH resource may be allocated for other uplink transmissions. The UE 115-*a* may transmit an ACK/NACK bit individually (e.g., not in the ACK/NACK codebook) for a downlink transmission associated with a corresponding downlink HARQ ID (e.g., a downlink HARQ ID for which on-demand NACK feedback is configured).

In addition to determining to request resources for transmitting NACK feedback for a downlink transmission based on whether the downlink transmission is configured for on-demand NACK feedback, the UE 115-*a* may determine to request resources for NACK feedback for a downlink transmission based on failing to decode the downlink transmission. In one example, the UE 115-*a* may determine to request resources for NACK feedback for a downlink transmission if at least one bit in an ACK/NACK codebook for the downlink transmission includes a NACK. That is, the UE 115-*a* may trigger the request 205 if at least one bit in the ACK/NACK codebook has a NACK. The ACK/NACK codebook may include ACK/NACK bits each corresponding to a portion of the downlink transmission. In another example, the UE 115-*a* may determine to request resources for NACK feedback for a downlink transmission if an ACK/NACK bit corresponding to a downlink HARQ ID for the downlink transmission is a NACK. That is, the UE 115-*a* may trigger the request 205 for resources for the NACK feedback if an ACK/NACK bit for a downlink HARQ ID linked to the downlink transmission is a NACK.

Once the UE 115-*a* determines to request resources to use to transmit NACK feedback for a downlink transmission, the UE 115-*a* may transmit a request 205 for the resources to the base station 105-*a*. The resources to be used by the UE 115-*a* to transmit the NACK feedback may be referred to as NACK feedback resources in some examples.

In some aspects, the UE 115-*a* may transmit a scheduling request (SR) including the request 205 for the NACK feedback resources for a downlink transmission. That is, the UE 115-*a* may send an SR to request NACK feedback resources based on identifying a NACK for a downlink transmission (e.g., for a delay-tolerable SPS downlink transmission), as indicated by the base station 105-*a*.

In other aspects, the UE 115-*a* may transmit the request 205 for the NACK feedback resources for a downlink transmission alongside HARQ feedback for another downlink transmission. That is, the UE 115-*a* may piggyback the request 205 for the NACK feedback resources on another ACK/NACK transmission. The other ACK/NACK transmission may be for a downlink transmission (e.g., scheduled by SPS or a dynamic grant) that is not configured for on-demand NACK feedback (e.g., configured for regular ACK/NACK feedback).

In yet other aspects, the UE 115-*a* may transmit the request 205 for the NACK feedback resources for a downlink transmission in uplink control information (UCI) or a MAC-CE. That is, the UE 115-*a* may send the request 205 in UCI or a MAC-CE which may be carried in PUCCH or PUSCH for an existing allocation. The PUCCH or PUSCH for the existing allocation may correspond to a PUCCH or PUSCH scheduled independent of the downlink transmission for which the NACK feedback resources are requested.

In yet other aspects, the UE 115-*a* may transmit the request 205 for the NACK feedback resources for a downlink transmission on dedicated resources for the request 205. The dedicated resources may be dedicated to the UE 115-*a* or a group of UEs 115 including the UE 115-*a* for requesting resources for NACK feedback (e.g., for sending the request 205 for NACK feedback resources for a downlink transmission and similar requests for NACK feedback resources for other downlink transmissions).

In yet other aspects, the UE 115-*a* may transmit the request 205 for the NACK feedback resources for a downlink transmission on contention-based resources for the request 205. The contention-based resources may refer to resources in a shared spectrum or an unshared spectrum. The UE 115-*a* may contend for access to the contention-based resources, and, after gaining access to the contention-based resources, the UE 115-*a* may transmit the request 205 on the contention-based resources. The use of contention-based resources for transmitting the request 205 for NACK feedback resources for a downlink transmission and similar requests for NACK feedback resources for other downlink transmissions may be suitable for a limited number of NACK requests.

The different aspects described herein related to transmitting the request 205 for NACK feedback resources correspond to different options for transmitting the request 205 for NACK feedback resources. In some cases, the UE 115-*a* may be configured (e.g., preconfigured) with a fixed option for transmitting the request 205 for NACK feedback resources (e.g., using an SR). In other cases, however, the option used to transmit the request 205 for NACK feedback resources may be configurable. For instance, the base station 105-*a* may transmit, and the UE 115-*a* may receive, an indication of resources or a message in which to transmit the request 205 for NACK feedback resources.

After receiving the request 205 for resources, the base station 105-*a* may grant resources to the UE 115-*a* to transmit NACK feedback for a downlink transmission. In particular, the base station 105-*a* may transmit a resource allocation 210 allocating resources to the UE 115-*a* for transmitting the NACK feedback (e.g., indicating the granted resource or resources). The UE 115-*a* may then transmit the NACK feedback 215 to the base station 105-*a* on the allocated resources. For instance, the UE 115 may transmit a corresponding ACK/NACK codebook for a downlink transmission containing a NACK bit on the allocated resources, or the UE 115-*a* may transmit a NACK bit for a downlink HARQ ID corresponding to the downlink transmission on the allocated resources. Thus, in line with the present disclosure, wireless communications system 200 may support efficient techniques for reducing the overhead associated with reporting feedback, such as HARQ feedback.

Figure 3:
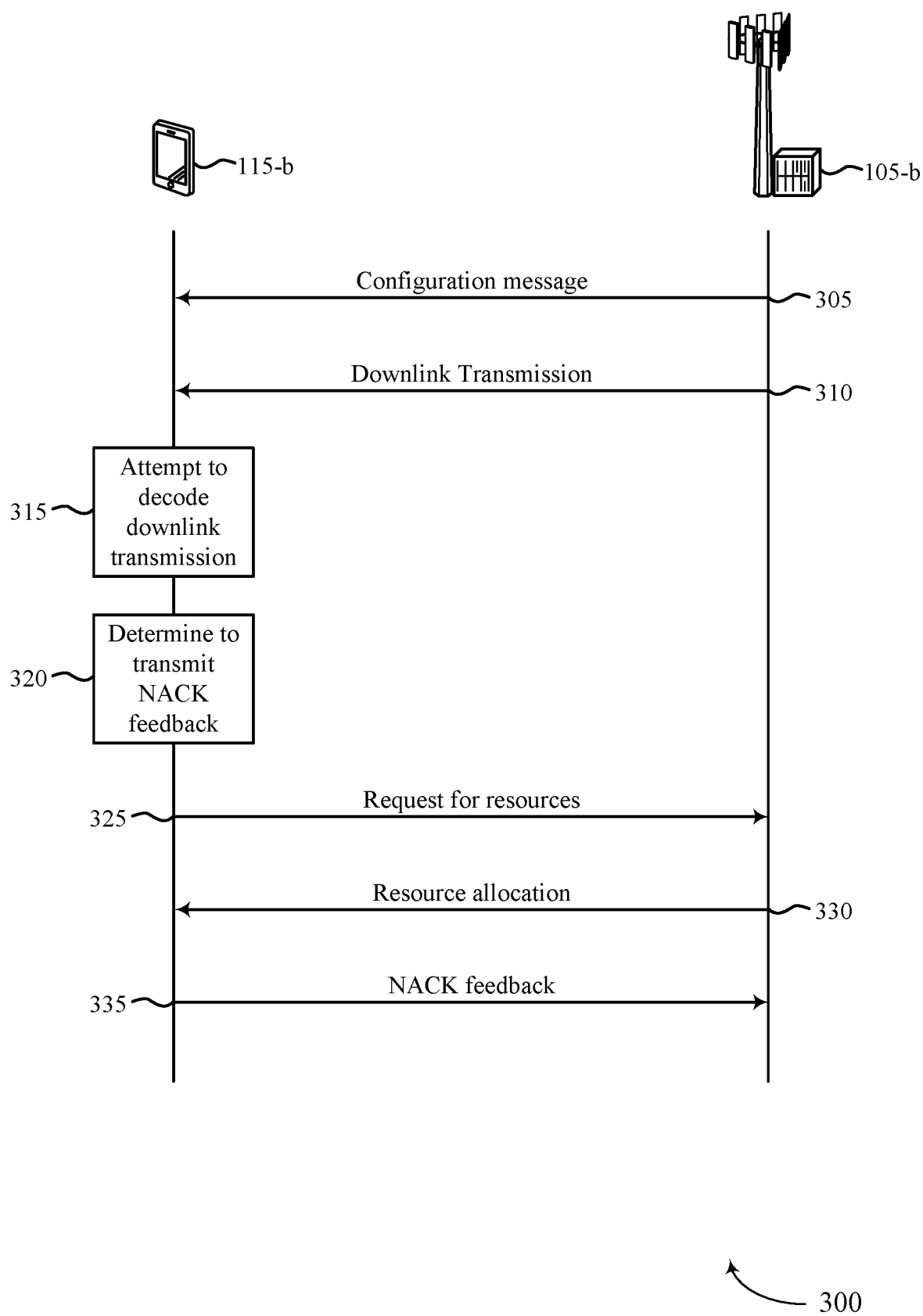
FIG. 3 illustrates an example of a process flow that supports on-demand negative acknowledgment resource request in accordance with aspects of the present disclosure.

FIG. 3 illustrates an example of a process flow 300 that supports on-demand negative acknowledgment resource request in accordance with aspects of the present disclosure. The process flow 300 illustrates aspects of techniques performed by a UE 115-*b*, which may be an example of a UE 115 described with reference to FIGS. 1 and 2. The process flow 300 also illustrates aspects of techniques performed by a base station 105-*b*, which may be an example of a base station 105 described with reference to FIGS. 1 and 2. The process flow 300 may implement aspects of the wireless communications system 100 and the wireless communications system 200 described with reference to FIGS. 1 and 2, respectively. For example, the process flow may support efficient techniques for allowing the UE 115-*b* to transmit NACK feedback to the base station 105-*b*.

In the following description of the process flow 300, the messages between the UE 115-*b* and the base station 105-*b* may be transmitted in a different order than the example order shown, or the operations performed by the base station 105 and the UE 115 may be performed in different orders or at different times. Some operations may also be omitted from the process flow 300, and other operations may be added to the process flow 300.

At 305, the base station 105-*b* may transmit, and the UE 115-*b* may receive, a configuration message indicating that the UE 115-*b* is to request resources for transmitting NACK feedback to the base station 105-*b* for a downlink transmission. The configuration message may be an RRC message, MAC-CE, or DCI. In some aspects, the configuration message may indicate all or a subset of SPS downlink transmissions for which the UE 115-*b* is to request resources for transmitting NACK feedback to the base station 105-*b*. In other aspects, the configuration message may indicate all or a subset of downlink HARQ IDs associated with downlink transmissions for which the UE 115-*b* is to request resources for transmitting NACK feedback to the base station 105-*b*. In yet other aspects, the configuration message may indicate one or more DCI-scheduled downlink transmissions for which the UE 115-*b* is to request resources for transmitting NACK feedback to the base station 105-*b*.

At 310, the base station 105-*b* may transmit the downlink transmission to the UE 115-*b*. At 315, the UE 115-*b* may attempt to decode the downlink transmission from the base station 105-*b*. At 320, the UE 115-*b* may determine to transmit the NACK feedback to the base station 105-*b* for the downlink transmission based on receiving the configuration message at 305 and attempting to decode the downlink transmission at 315. In some cases, the UE 115-*b* may determine to transmit the NACK feedback based on determining that an ACK/NACK codebook for the downlink transmission includes at least one NACK bit. In other cases, the UE 115-*b* may determine to transmit the NACK feedback based on determining that an ACK/NACK feedback bit for a HARQ ID corresponding to the downlink transmission is a NACK.

At 325, the UE 115-*b* may transmit, and the base station 105-*b* may receive, a request for resources for transmitting the NACK feedback based on determining to transmit the NACK feedback. In some aspects, the UE 115-*b* may transmit, and the base station 105-*b* may receive, an SR including the request for resources for transmitting the NACK feedback. In other aspects, the UE 115-*b* may transmit, and the base station 105-*b* may receive, the request for resources for transmitting the NACK feedback on an ACK/NACK feedback resource for another downlink transmission (e.g., a different downlink transmission from the downlink transmission transmitted at 310). In yet other aspects, the UE 115-*b* may transmit, and the base station 105-*b* may receive, the request for resources for transmitting the NACK feedback in UCI or a MAC-CE of an existing allocation (e.g., in a PDCCH or PDSCH scheduled independent of the NACK feedback).

In some cases, the UE 115-*b* or a group of UEs 115 including the UE 115-*b* may be configured with dedicated resources to transmit the request for resources for the NACK feedback. In such cases, the UE 115-*b* may transmit, and the base station 105-*b* may receive, the request for resources for transmitting the NACK feedback on the dedicated resources for the request. In other cases, the UE 115-*b* may contend for access to resources to transmit the request for resources for the NACK feedback. In such cases, the UE 115-*b* may transmit, and the base station 105-*b* may receive, the request for resources for transmitting the NACK feedback on contention-based resources for the request. In some examples, the base station 105-*b* may transmit, and the UE 115-*b* may receive, an indication of resources or a message in which the UE 115-*b* is to transmit the request for resources for transmitting the NACK feedback (e.g., the resources or message used to transmit the request at 325 may be configurable).

At 330, the base station 105-*b* may transmit, and the UE 115-*b* may receive an indication of resources allocated for transmitting the NACK feedback based on transmitting the request for resources at 325. At 335, the UE 115-*b* may then transmit, and the base station 105-*b* may receive, the NACK feedback on the indicated resources. For instance, the UE 115-*b* may transmit, and the base station 105-*b* may receive, the NACK feedback associated with a corresponding ACK/NACK codebook or downlink HARQ ID containing at least one NACK bit on the resources allocated based on the request for resources. Thus, in line with the present disclosure, process flow 300 may be implemented by or may support efficient techniques for reducing the overhead associated with reporting feedback, such as HARQ feedback along with on-demand NACK resource request aspects.

Figure 4:
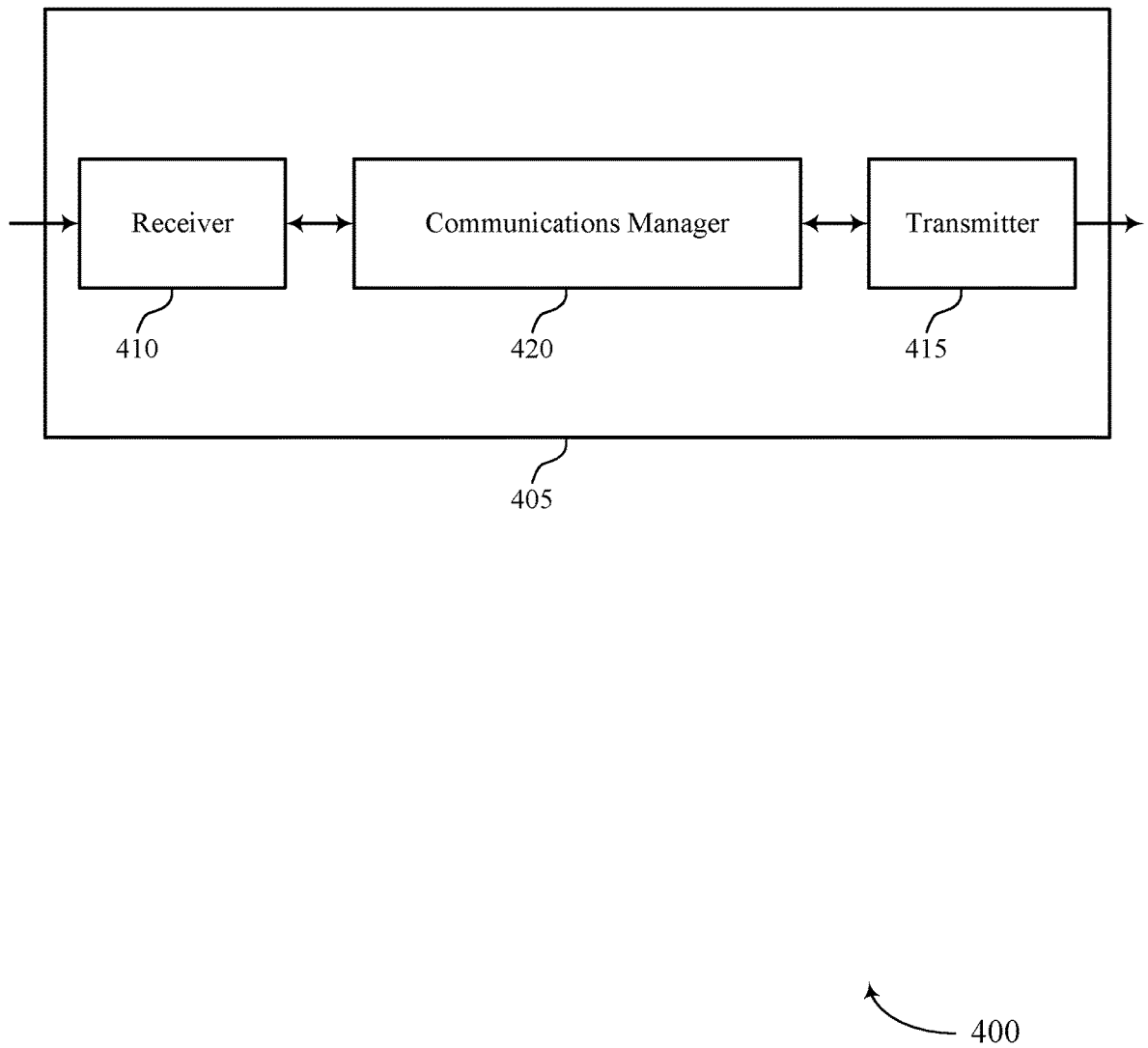
FIGS. 4 and 5 show block diagrams of devices that support on-demand negative acknowledgment resource request in accordance with aspects of the present disclosure.

FIG. 4 shows a block diagram 400 of a device 405 that supports on-demand negative acknowledgment resource request in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to on-demand negative acknowledgment resource request). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to on-demand negative acknowledgment resource request). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of on-demand negative acknowledgment resource request as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, a configuration message indicating that the UE is to request resources for transmitting negative acknowledgment feedback to the base station for a downlink transmission. The communications manager 420 may be configured as or otherwise support a means for attempting to decode the downlink transmission from the base station. The communications manager 420 may be configured as or otherwise support a means for determining to transmit the negative acknowledgment feedback to the base station for the downlink transmission based on receiving the configuration message and attempting to decode the downlink transmission. The communications manager 420 may be configured as or otherwise support a means for transmitting, to the base station, a request for resources for transmitting the negative acknowledgment feedback based on determining to transmit the negative acknowledgment feedback.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reducing power consumption and utilizing resources for efficiently. In particular, because the communications manager 420 may support techniques for requesting resources for transmitting NACK feedback, the communications manager 420 may avoid wasting power and resources to transmit feedback for every downlink transmission (e.g., even when not otherwise needed).

Figure 5:
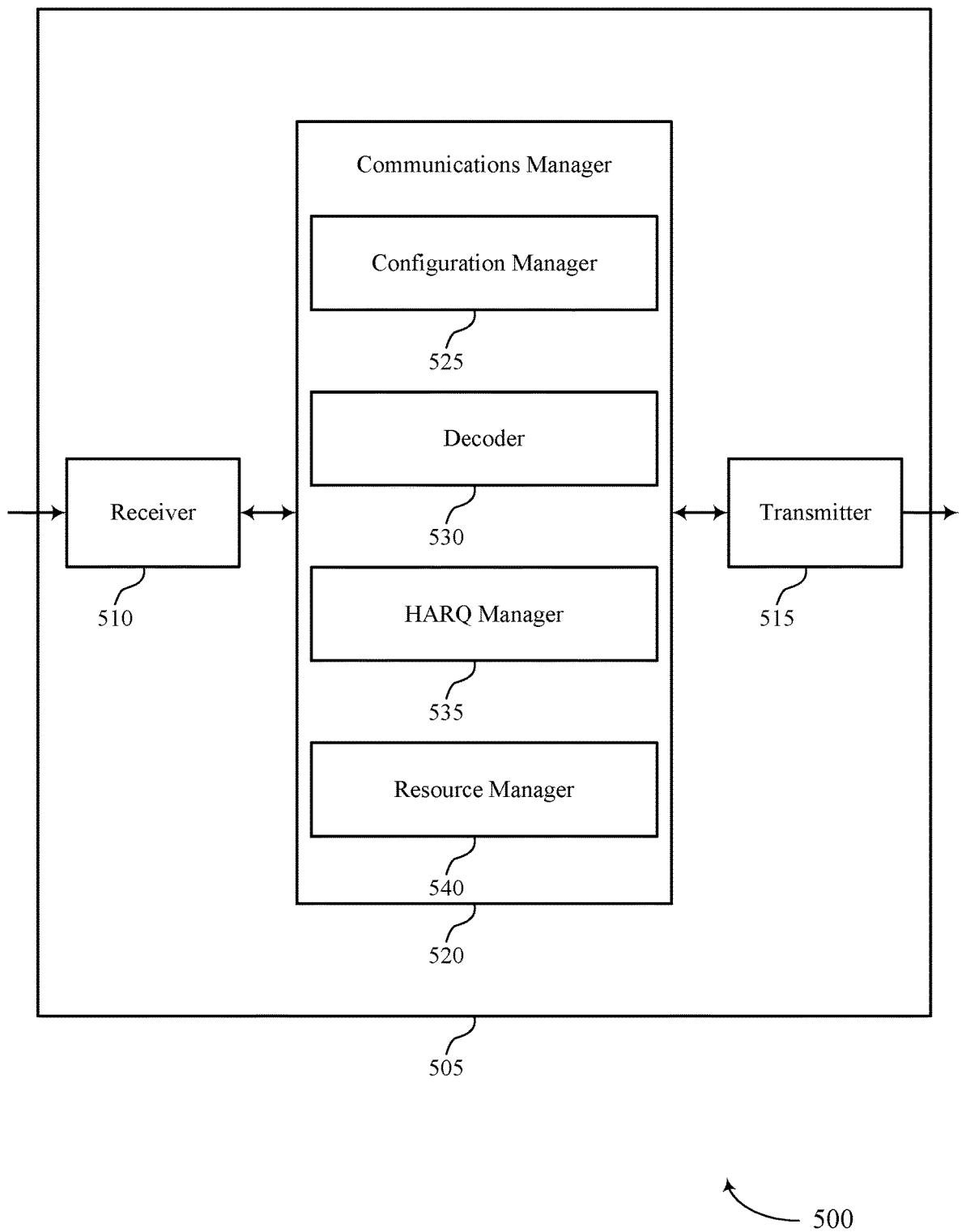

FIG. 5 shows a block diagram 500 of a device 505 that supports on-demand negative acknowledgment resource request in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to on-demand negative acknowledgment resource request). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to on-demand negative acknowledgment resource request). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of on-demand negative acknowledgment resource request as described herein. For example, the communications manager 520 may include a configuration manager 525, a decoder 530, an HARQ manager 535, a resource manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The configuration manager 525 may be configured as or otherwise support a means for receiving, from a base station, a configuration message indicating that the UE is to request resources for transmitting negative acknowledgment feedback to the base station for a downlink transmission. The decoder 530 may be configured as or otherwise support a means for attempting to decode the downlink transmission from the base station. The HARQ manager 535 may be configured as or otherwise support a means for determining to transmit the negative acknowledgment feedback to the base station for the downlink transmission based on receiving the configuration message and attempting to decode the downlink transmission. The resource manager 540 may be configured as or otherwise support a means for transmitting, to the base station, a request for resources for transmitting the negative acknowledgment feedback based on determining to transmit the negative acknowledgment feedback.

Figure 6:
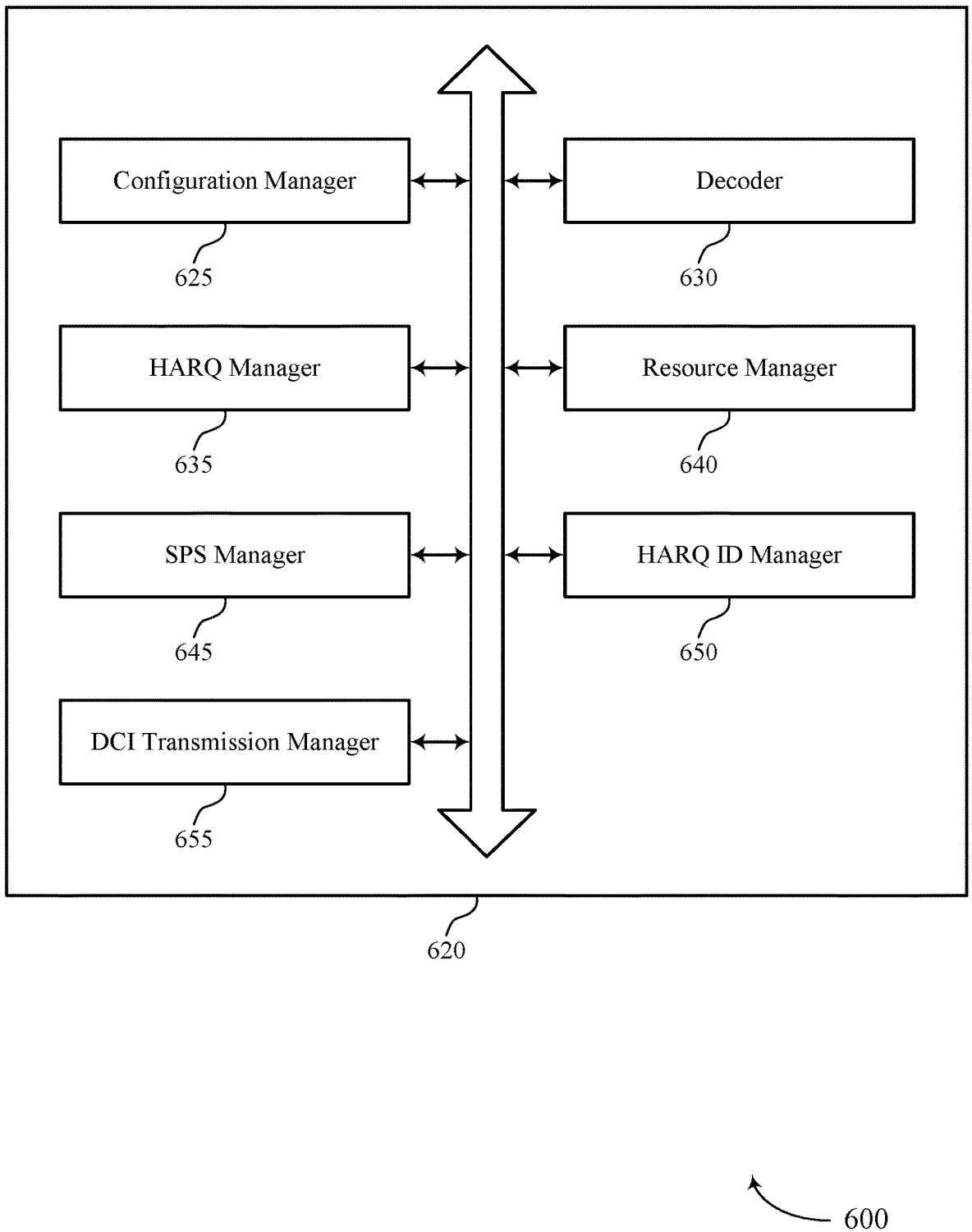
FIG. 6 shows a block diagram of a communications manager that supports on-demand negative acknowledgment resource request in accordance with aspects of the present disclosure.

FIG. 6 shows a block diagram 600 of a communications manager 620 that supports on-demand negative acknowledgment resource request in accordance with aspects of the present disclosure. The communications manager 620 may be an example of aspects of a communications manager 420, a communications manager 520, or both, as described herein. The communications manager 620, or various components thereof, may be an example of means for performing various aspects of on-demand negative acknowledgment resource request as described herein. For example, the communications manager 620 may include a configuration manager 625, a decoder 630, an HARQ manager 635, a resource manager 640, an SPS manager 645, an HARQ ID manager 650, a DCI transmission manager 655, or any combination thereof. Each of these components may communicate, directly or indirectly, with one another (e.g., via one or more buses).

The communications manager 620 may support wireless communication at a UE in accordance with examples as disclosed herein. The configuration manager 625 may be configured as or otherwise support a means for receiving, from a base station, a configuration message indicating that the UE is to request resources for transmitting negative acknowledgment feedback to the base station for a downlink transmission. The decoder 630 may be configured as or otherwise support a means for attempting to decode the downlink transmission from the base station. The HARQ manager 635 may be configured as or otherwise support a means for determining to transmit the negative acknowledgment feedback to the base station for the downlink transmission based on receiving the configuration message and attempting to decode the downlink transmission. The resource manager 640 may be configured as or otherwise support a means for transmitting, to the base station, a request for resources for transmitting the negative acknowledgment feedback based on determining to transmit the negative acknowledgment feedback.

In some examples, the resource manager 640 may be configured as or otherwise support a means for receiving, from the base station, an indication of resources allocated for transmitting the negative acknowledgment feedback based on transmitting the request for the resources. In some examples, the HARQ manager 635 may be configured as or otherwise support a means for transmitting the negative acknowledgment feedback to the base station on the indicated resources.

In some examples, to support receiving the configuration message indicating that the UE is to request resources for transmitting negative acknowledgment feedback to the base station, the SPS manager 645 may be configured as or otherwise support a means for receiving, in the configuration message, an indication of all or a subset of semi-persistent scheduling downlink transmissions for which the UE is to request resources for transmitting negative acknowledgment feedback to the base station.

In some examples, to support receiving the configuration message indicating that the UE is to request resources for the negative acknowledgment feedback to the base station, the HARQ ID manager 650 may be configured as or otherwise support a means for receiving, in the configuration message, an indication of all or a subset of downlink hybrid automatic repeat request identifiers associated with downlink transmissions for which the UE is to request resources for transmitting negative acknowledgment feedback to the base station.

In some examples, to support receiving the configuration message indicating that the UE is to request resources for transmitting negative acknowledgment feedback to the base station, the DCI transmission manager 655 may be configured as or otherwise support a means for receiving, in the configuration message, an indication of one or more downlink control information scheduled downlink transmissions for which the UE is to request resources for transmitting the negative acknowledgment feedback to the base station.

In some examples, to support determining to transmit the negative acknowledgment feedback to the base station for the downlink transmission, the HARQ manager 635 may be configured as or otherwise support a means for determining that an acknowledgment or negative acknowledgment codebook for the downlink transmission includes at least one negative acknowledgment.

In some examples, to support determining to transmit the negative acknowledgment feedback to the base station for the downlink transmission, the HARQ manager 635 may be configured as or otherwise support a means for determining that an acknowledgment or negative acknowledgment feedback bit for a hybrid automatic repeat request identifier corresponding to the downlink transmission includes a negative acknowledgment.

In some examples, to support transmitting the request for resources for transmitting the negative acknowledgment feedback, the resource manager 640 may be configured as or otherwise support a means for transmitting a scheduling request including the request for resources for transmitting the negative acknowledgment feedback.

In some examples, to support transmitting the request for resources for transmitting the negative acknowledgment feedback, the resource manager 640 may be configured as or otherwise support a means for transmitting the request for resources for transmitting the negative acknowledgment feedback on an acknowledgment or negative acknowledgment feedback resource for a second downlink transmission.

In some examples, to support transmitting the request for resources for transmitting the negative acknowledgment feedback, the resource manager 640 may be configured as or otherwise support a means for transmitting the request for resources for transmitting the negative acknowledgment feedback in uplink control information or a medium access control control element of an existing allocation.

In some examples, to support transmitting the request for resources for transmitting the negative acknowledgment feedback, the resource manager 640 may be configured as or otherwise support a means for transmitting the request for resources for transmitting the negative acknowledgment feedback on dedicated resources for the request allocated to the UE or a group of UEs including the UE.

In some examples, to support transmitting the request for resources for transmitting the negative acknowledgment feedback, the resource manager 640 may be configured as or otherwise support a means for transmitting the request for resources for transmitting the negative acknowledgment feedback on contention-based resources for the request.

In some examples, the resource manager 640 may be configured as or otherwise support a means for receiving an indication of resources or a message in which the UE is to transmit the request for resources for transmitting the negative acknowledgment feedback.

In some examples, the HARQ manager 635 may be configured as or otherwise support a means for transmitting the negative acknowledgment feedback associated with a corresponding acknowledgment or negative acknowledgment codebook or downlink HARQ identifier containing at least one negative acknowledgment bit to the base station on resources allocated based on the request for resources.

In some examples, the configuration message is received in a radio resource control message, a medium access control control element, or a downlink control information message.

Figure 7:
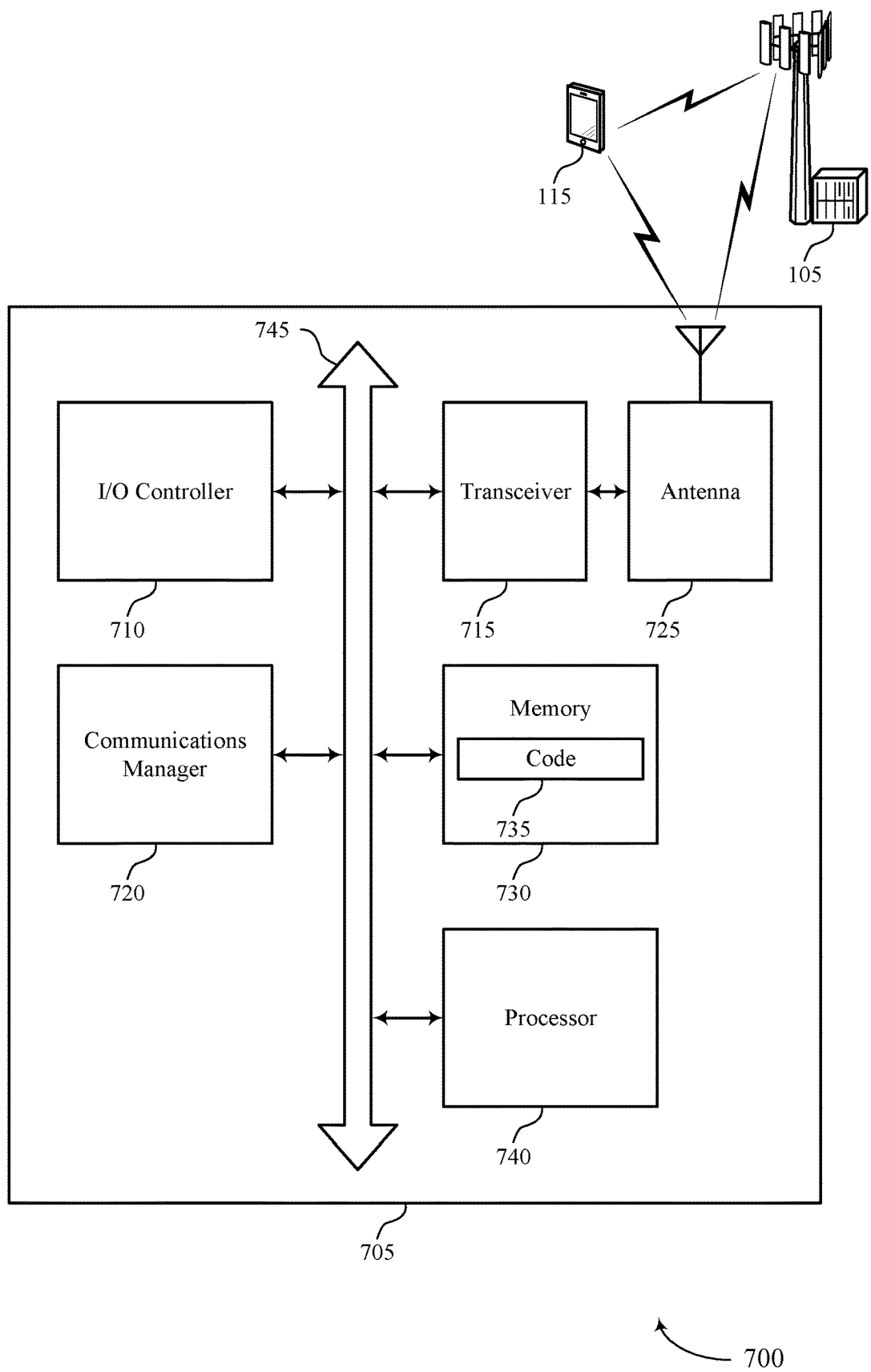
FIG. 7 shows a diagram of a system including a device that supports on-demand negative acknowledgment resource request in accordance with aspects of the present disclosure.

FIG. 7 shows a diagram of a system 700 including a device 705 that supports on-demand negative acknowledgment resource request in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting on-demand negative acknowledgment resource request). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, a configuration message indicating that the UE is to request resources for transmitting negative acknowledgment feedback to the base station for a downlink transmission. The communications manager 720 may be configured as or otherwise support a means for attempting to decode the downlink transmission from the base station. The communications manager 720 may be configured as or otherwise support a means for determining to transmit the negative acknowledgment feedback to the base station for the downlink transmission based on receiving the configuration message and attempting to decode the downlink transmission. The communications manager 720 may be configured as or otherwise support a means for transmitting, to the base station, a request for resources for transmitting the negative acknowledgment feedback based on determining to transmit the negative acknowledgment feedback.

By including or configuring the communications manager 720 in accordance with examples as described herein, the device 705 may support techniques for reducing power consumption and utilizing resources for efficiently. In particular, because the communications manager 420 may support techniques for requesting resources for transmitting NACK feedback, the communications manager 420 may avoid wasting power and resources to transmit feedback for every downlink transmission (e.g., even when not otherwise needed).

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of on-demand negative acknowledgment resource request as described herein, or the processor 740 and the memory 730 may be otherwise configured to perform or support such operations.

Figure 8:
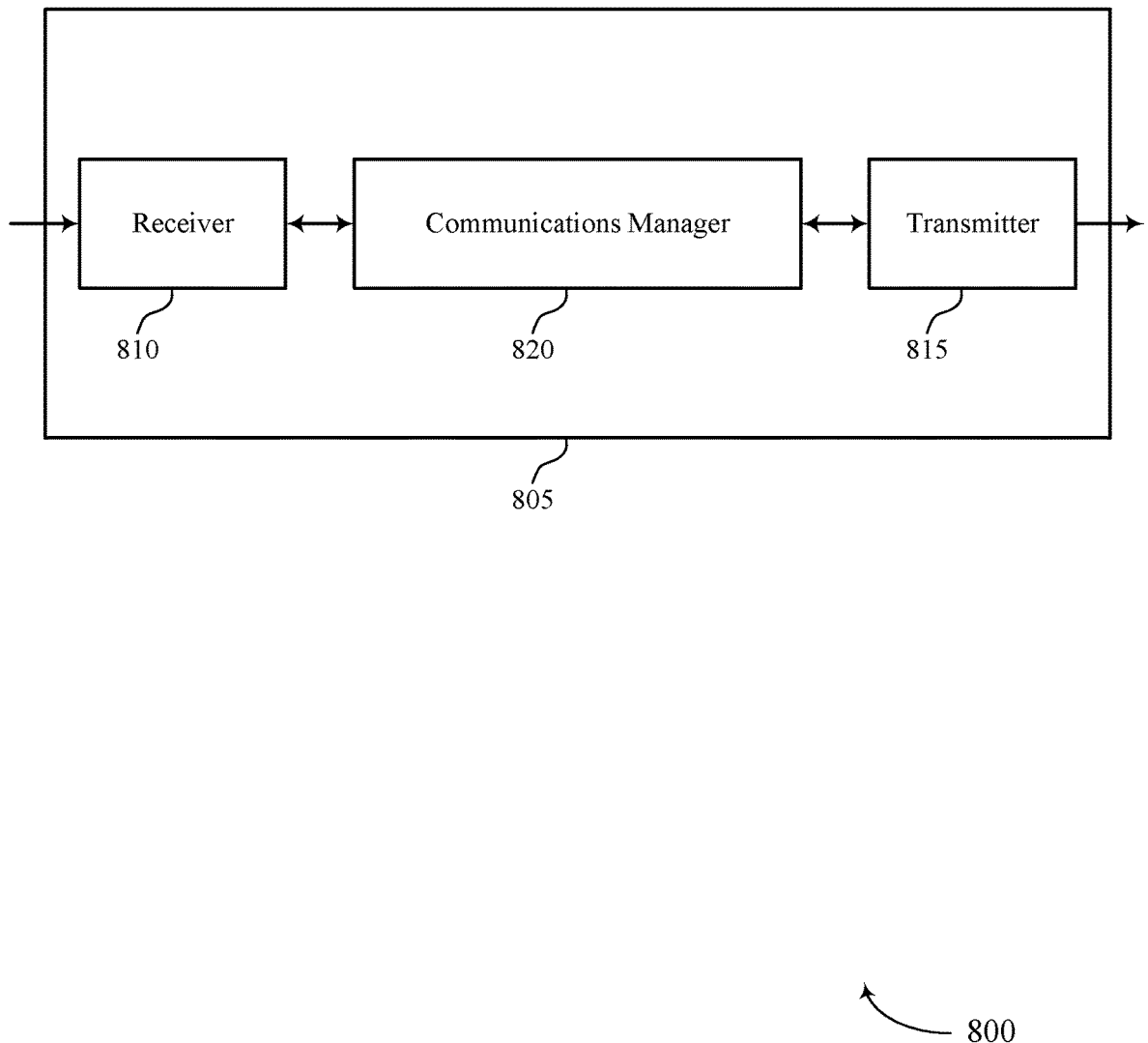
FIGS. 8 and 9 show block diagrams of devices that support on-demand negative acknowledgment resource request in accordance with aspects of the present disclosure.

FIG. 8 shows a block diagram 800 of a device 805 that supports on-demand negative acknowledgment resource request in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to on-demand negative acknowledgment resource request). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to on-demand negative acknowledgment resource request). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of on-demand negative acknowledgment resource request as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, a configuration message indicating that the UE is to request resources for transmitting negative acknowledgment feedback to the base station for a downlink transmission. The communications manager 820 may be configured as or otherwise support a means for transmitting the downlink transmission to the UE. The communications manager 820 may be configured as or otherwise support a means for receiving, from the UE based on transmitting the configuration message and on transmitting the downlink transmission, a request for resources to be used by the UE to transmit the negative acknowledgment feedback for the downlink transmission. The communications manager 820 may be configured as or otherwise support a means for transmitting, to the UE based on receiving the request, an indication of resources allocated for transmitting the negative acknowledgment feedback.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reducing power consumption and utilizing resources more efficiently. In particular, because the communications manager 720 may support techniques for allocating resources for NACK feedback from a UE in response to a request from the UE for the resources, the communications manager 720 may avoid wasting power and resources to receive feedback for every downlink transmission.

Figure 9:
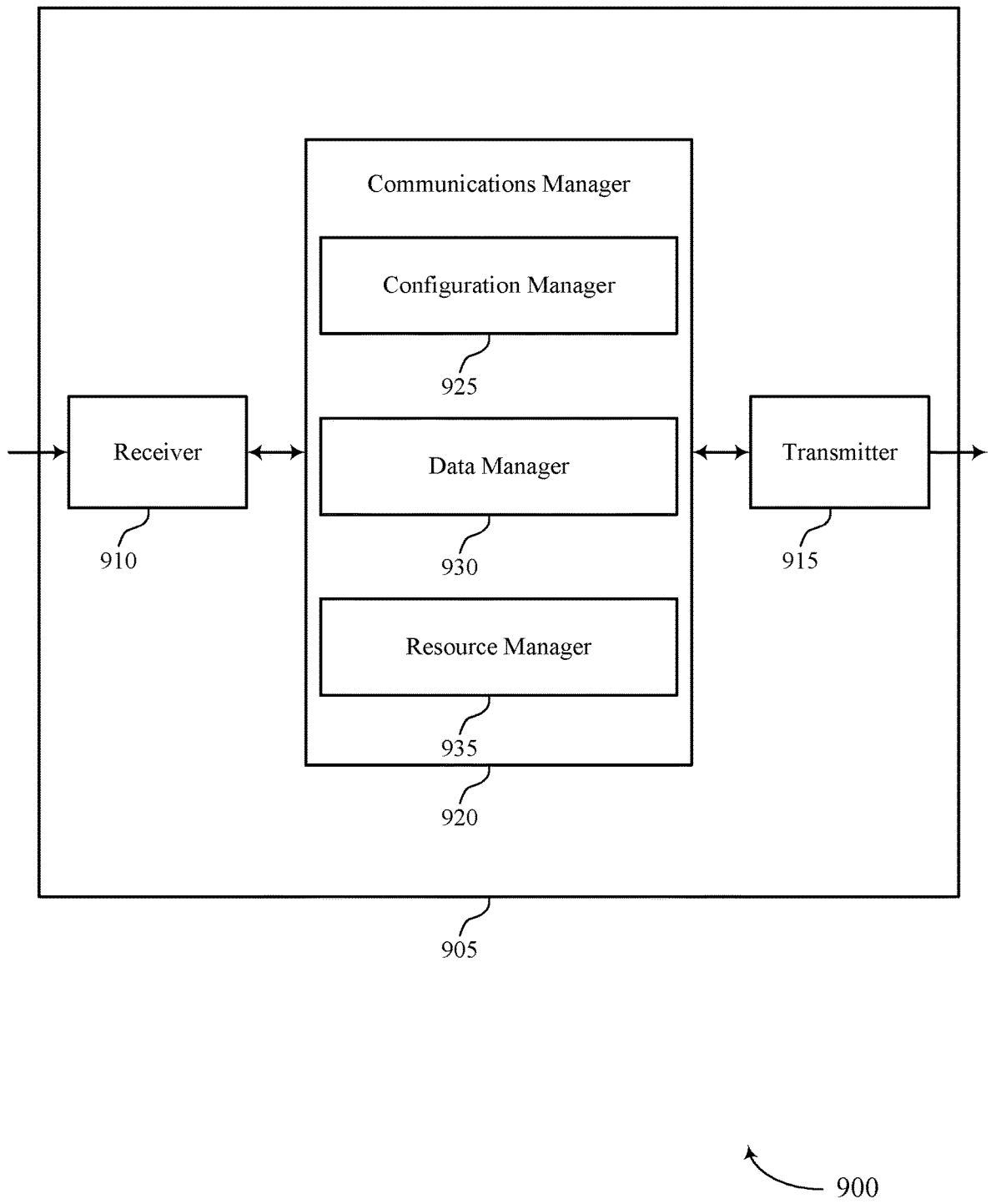

FIG. 9 shows a block diagram 900 of a device 905 that supports on-demand negative acknowledgment resource request in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to on-demand negative acknowledgment resource request). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to on-demand negative acknowledgment resource request). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of on-demand negative acknowledgment resource request as described herein. For example, the communications manager 920 may include a configuration manager 925, a data manager 930, a resource manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The configuration manager 925 may be configured as or otherwise support a means for transmitting, to a UE, a configuration message indicating that the UE is to request resources for transmitting negative acknowledgment feedback to the base station for a downlink transmission. The data manager 930 may be configured as or otherwise support a means for transmitting the downlink transmission to the UE. The resource manager 935 may be configured as or otherwise support a means for receiving, from the UE based on transmitting the configuration message and on transmitting the downlink transmission, a request for resources to be used by the UE to transmit the negative acknowledgment feedback for the downlink transmission. The resource manager 935 may be configured as or otherwise support a means for transmitting, to the UE based on receiving the request, an indication of resources allocated for transmitting the negative acknowledgment feedback.

Figure 10:
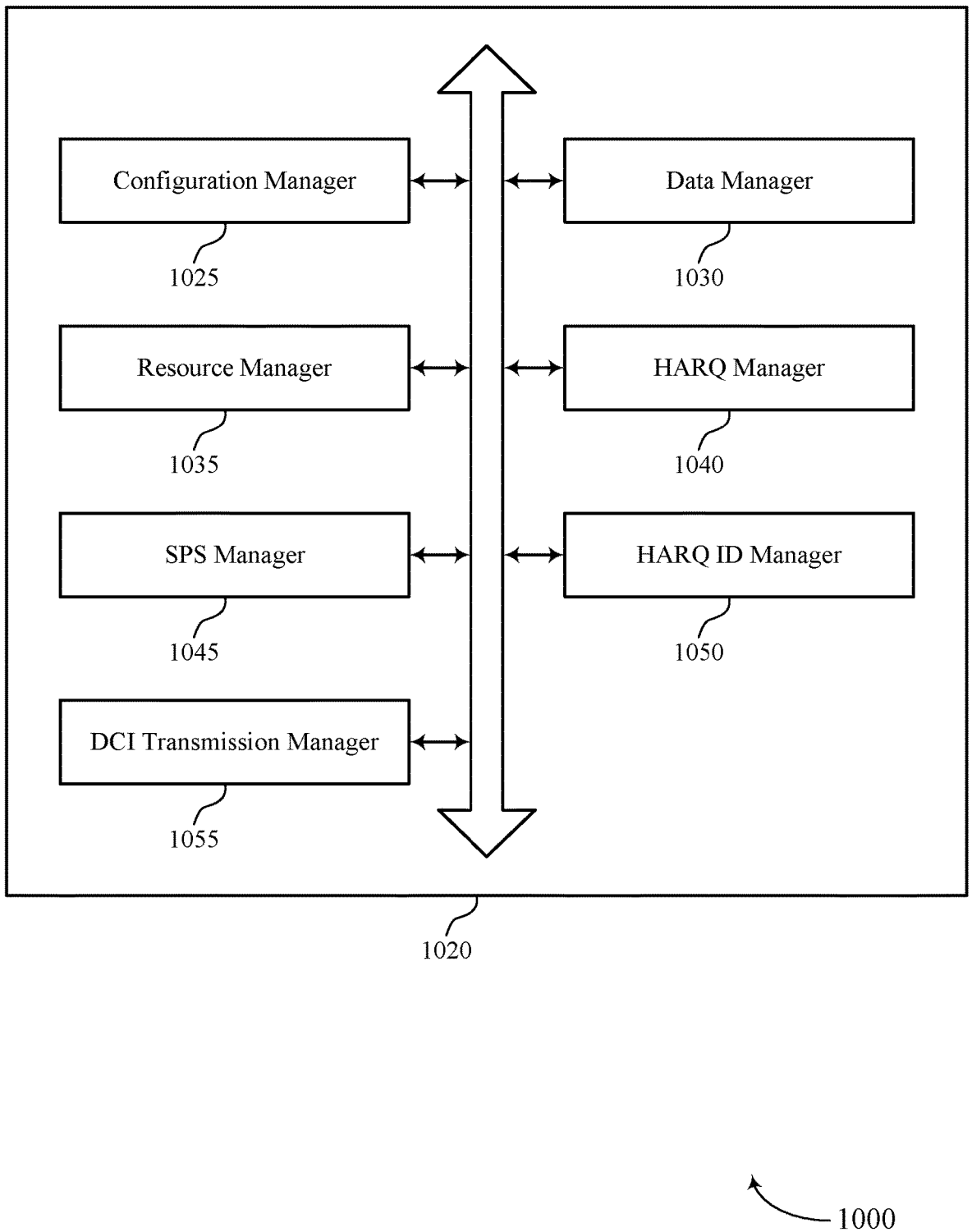
FIG. 10 shows a block diagram of a communications manager that supports on-demand negative acknowledgment resource request in accordance with aspects of the present disclosure.

FIG. 10 shows a block diagram 1000 of a communications manager 1020 that supports on-demand negative acknowledgment resource request in accordance with aspects of the present disclosure. The communications manager 1020 may be an example of aspects of a communications manager 820, a communications manager 920, or both, as described herein. The communications manager 1020, or various components thereof, may be an example of means for performing various aspects of on-demand negative acknowledgment resource request as described herein. For example, the communications manager 1020 may include a configuration manager 1025, a data manager 1030, a resource manager 1035, an HARQ manager 1040, an SPS manager 1045, an HARQ ID manager 1050, a DCI transmission manager 1055, or any combination thereof. Each of these components may communicate, directly or indirectly, with one another (e.g., via one or more buses).

The communications manager 1020 may support wireless communication at a base station in accordance with examples as disclosed herein. The configuration manager 1025 may be configured as or otherwise support a means for transmitting, to a UE, a configuration message indicating that the UE is to request resources for transmitting negative acknowledgment feedback to the base station for a downlink transmission. The data manager 1030 may be configured as or otherwise support a means for transmitting the downlink transmission to the UE. The resource manager 1035 may be configured as or otherwise support a means for receiving, from the UE based on transmitting the configuration message and on transmitting the downlink transmission, a request for resources to be used by the UE to transmit the negative acknowledgment feedback for the downlink transmission. In some examples, the resource manager 1035 may be configured as or otherwise support a means for transmitting, to the UE based on receiving the request, an indication of resources allocated for transmitting the negative acknowledgment feedback.

In some examples, the HARQ manager 1040 may be configured as or otherwise support a means for receiving the negative acknowledgment feedback from the UE on the indicated resources based on transmitting the indication of the resources.

In some examples, to support transmitting the configuration message indicating that the UE is to request resources for transmitting negative acknowledgment feedback to the base station, the SPS manager 1045 may be configured as or otherwise support a means for transmitting, in the configuration message, an indication of all or a subset of semi-persistent scheduling downlink transmissions for which the UE is to request resources for transmitting negative acknowledgment feedback to the base station.

In some examples, to support transmitting the configuration message indicating that the UE is to request resources for transmitting negative acknowledgment feedback to the base station, the HARQ ID manager 1050 may be configured as or otherwise support a means for transmitting, in the configuration message, an indication of all or a subset of downlink hybrid automatic repeat request identifiers associated with downlink transmissions for which the UE is to request resources for transmitting negative acknowledgment feedback to the base station.

In some examples, to support transmitting the configuration message indicating that the UE is to request resources for transmitting negative acknowledgment feedback to the base station, the DCI transmission manager 1055 may be configured as or otherwise support a means for transmitting, in the configuration message, an indication of one or more downlink control information scheduled downlink transmissions for which the UE is to request resources for transmitting negative acknowledgment feedback to the base station.

In some examples, to support receiving the request for resources to be used by the UE to transmit the negative acknowledgment feedback, the resource manager 1035 may be configured as or otherwise support a means for receiving a scheduling request including the request for resources to be used by the UE to transmit the negative acknowledgment feedback.

In some examples, to support receiving the request for resources to be used by the UE to transmit the negative acknowledgment feedback, the resource manager 1035 may be configured as or otherwise support a means for receiving the request for resources to be used by the UE to transmit the negative acknowledgment feedback on an acknowledgment or negative acknowledgment feedback resource for a second downlink transmission.

In some examples, to support receiving the request for resources to be used by the UE to transmit the negative acknowledgment feedback, the resource manager 1035 may be configured as or otherwise support a means for receiving the request for resources to be used by the UE to transmit the negative acknowledgment feedback in uplink control information or a medium access control control element of an existing allocation.

In some examples, to support receiving the request for resources to be used by the UE to transmit the negative acknowledgment feedback, the resource manager 1035 may be configured as or otherwise support a means for receiving the request for resources to be used by the UE to transmit the negative acknowledgment feedback on dedicated resources for the request allocated to the UE or a group of UEs including the UE.

In some examples, to support receiving the request for resources to be used by the UE to transmit the negative acknowledgment feedback, the resource manager 1035 may be configured as or otherwise support a means for receiving the request for resources to be used by the UE to transmit the negative acknowledgment feedback on contention-based resources for the request.

In some examples, the resource manager 1035 may be configured as or otherwise support a means for transmitting an indication of resources or a message in which the UE is to transmit the request for resources for transmitting the negative acknowledgment feedback.

In some examples, the HARQ manager 1040 may be configured as or otherwise support a means for receiving the negative acknowledgment feedback associated with a corresponding acknowledgment or negative acknowledgment codebook or downlink hybrid automatic repeat request identifier containing at least one negative acknowledgment bit from the UE on resources allocated based on the request for resources.

In some examples, the configuration message is transmitted in a radio resource control message, a medium access control control element, or a downlink control information message.

Figure 11:
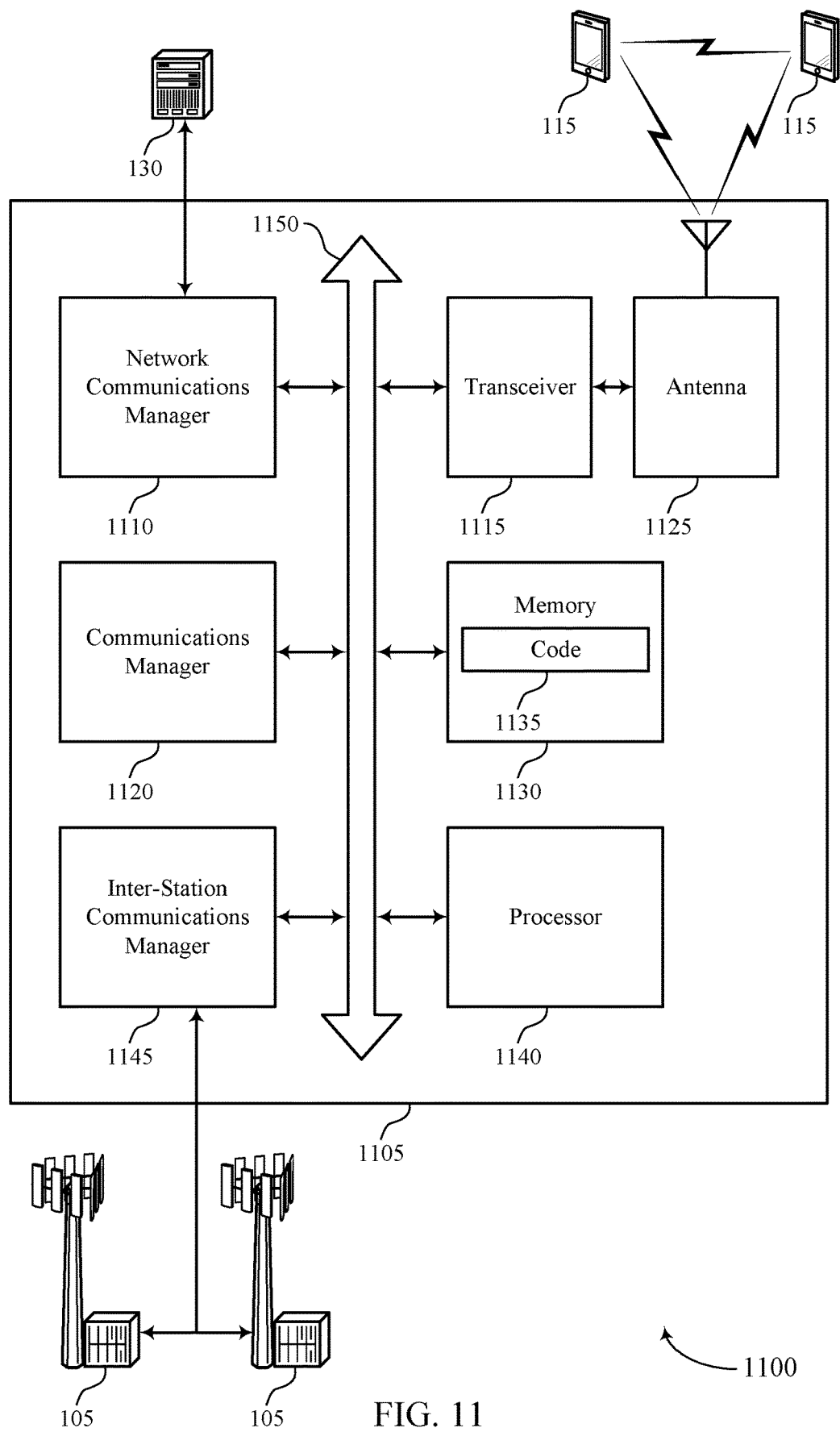
FIG. 11 shows a diagram of a system including a device that supports on-demand negative acknowledgment resource request in accordance with aspects of the present disclosure.

FIG. 11 shows a diagram of a system 1100 including a device 1105 that supports on-demand negative acknowledgment resource request in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting on-demand negative acknowledgment resource request). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, a configuration message indicating that the UE is to request resources for transmitting negative acknowledgment feedback to the base station for a downlink transmission. The communications manager 1120 may be configured as or otherwise support a means for transmitting the downlink transmission to the UE. The communications manager 1120 may be configured as or otherwise support a means for receiving, from the UE based on transmitting the configuration message and on transmitting the downlink transmission, a request for resources to be used by the UE to transmit the negative acknowledgment feedback for the downlink transmission. The communications manager 1120 may be configured as or otherwise support a means for transmitting, to the UE based on receiving the request, an indication of resources allocated for transmitting the negative acknowledgment feedback.

By including or configuring the communications manager 1120 in accordance with examples as described herein, the device 1105 may support techniques for reducing power consumption and utilizing resources more efficiently. In particular, because the communications manager 720 may support techniques for allocating resources for NACK feedback from a UE in response to a request from the UE for the resources, the communications manager 720 may avoid wasting power and resources to receive feedback for every downlink transmission.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of on-demand negative acknowledgment resource request as described herein, or the processor 1140 and the memory 1130 may be otherwise configured to perform or support such operations.

Figure 12:
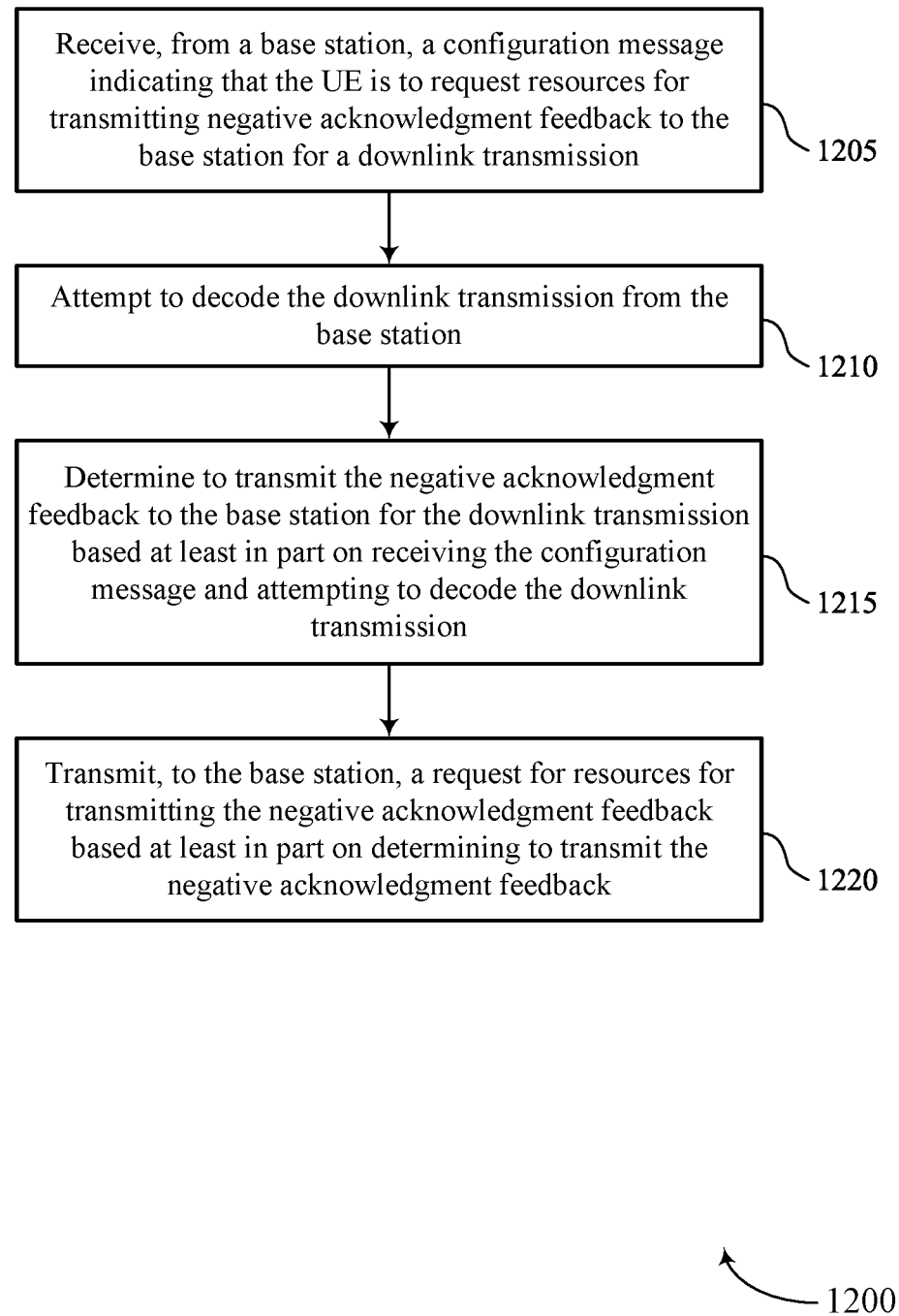
FIGS. 12 and 13 show flowcharts illustrating methods that support on-demand negative acknowledgment resource request in accordance with aspects of the present disclosure.

FIG. 12 shows a flowchart illustrating a method 1200 that supports on-demand negative acknowledgment resource request in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a base station, a configuration message indicating that the UE is to request resources for transmitting negative acknowledgment feedback to the base station for a downlink transmission. The operations of 1205 may be performed in accordance with examples as disclosed herein. In some examples, aspects of the operations of 1205 may be performed by a configuration manager 625 as described with reference to FIG. 6.

At 1210, the method may include attempting to decode the downlink transmission from the base station. The operations of 1210 may be performed in accordance with examples as disclosed herein. In some examples, aspects of the operations of 1210 may be performed by a decoder 630 as described with reference to FIG. 6.

At 1215, the method may include determining to transmit the negative acknowledgment feedback to the base station for the downlink transmission based on receiving the configuration message and attempting to decode the downlink transmission. The operations of 1215 may be performed in accordance with examples as disclosed herein. In some examples, aspects of the operations of 1215 may be performed by an HARQ manager 635 as described with reference to FIG. 6.

At 1220, the method may include transmitting, to the base station, a request for resources for transmitting the negative acknowledgment feedback based on determining to transmit the negative acknowledgment feedback. The operations of 1220 may be performed in accordance with examples as disclosed herein. In some examples, aspects of the operations of 1220 may be performed by a resource manager 640 as described with reference to FIG. 6.

Figure 13:
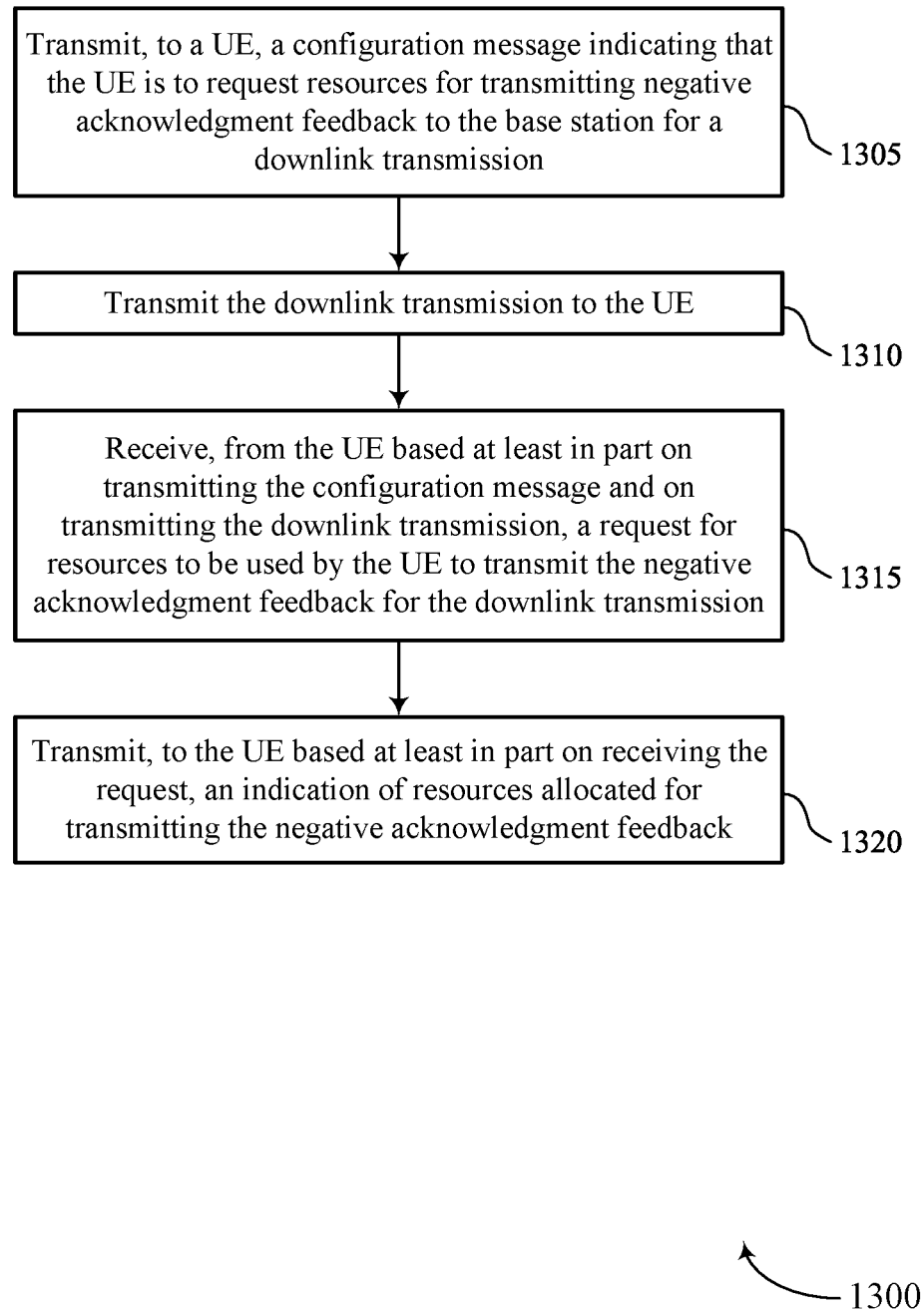

FIG. 13 shows a flowchart illustrating a method 1300 that supports on-demand negative acknowledgment resource request in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1305, the method may include transmitting, to a UE, a configuration message indicating that the UE is to request resources for transmitting negative acknowledgment feedback to the base station for a downlink transmission. The operations of 1305 may be performed in accordance with examples as disclosed herein. In some examples, aspects of the operations of 1305 may be performed by a configuration manager 1025 as described with reference to FIG. 10.

At 1310, the method may include transmitting the downlink transmission to the UE. The operations of 1310 may be performed in accordance with examples as disclosed herein. In some examples, aspects of the operations of 1310 may be performed by a data manager 1030 as described with reference to FIG. 10.

At 1315, the method may include receiving, from the UE based on transmitting the configuration message and on transmitting the downlink transmission, a request for resources to be used by the UE to transmit the negative acknowledgment feedback for the downlink transmission. The operations of 1315 may be performed in accordance with examples as disclosed herein. In some examples, aspects of the operations of 1315 may be performed by a resource manager 1035 as described with reference to FIG. 10.

At 1320, the method may include transmitting, to the UE based on receiving the request, an indication of resources allocated for transmitting the negative acknowledgment feedback. The operations of 1320 may be performed in accordance with examples as disclosed herein. In some examples, aspects of the operations of 1320 may be performed by a resource manager 1035 as described with reference to FIG. 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, from a base station, a configuration message indicating that the UE is to request resources for transmitting negative acknowledgment feedback to the base station for a downlink transmission; attempting to decode the downlink transmission from the base station; determining to transmit the negative acknowledgment feedback to the base station for the downlink transmission based at least in part on receiving the configuration message and attempting to decode the downlink transmission; and transmitting, to the base station, a request for resources for transmitting the negative acknowledgment feedback based at least in part on determining to transmit the negative acknowledgment feedback.

Aspect 2: The method of aspect 1, further comprising: receiving, from the base station, an indication of resources allocated for transmitting the negative acknowledgment feedback based at least in part on transmitting the request for the resources; and transmitting the negative acknowledgment feedback to the base station on the indicated resources.

Aspect 3: The method of any of aspects 1 through 2, wherein receiving the configuration message indicating that the UE is to request resources for transmitting the negative acknowledgment feedback to the base station comprises: receiving, in the configuration message, an indication of all or a subset of semi-persistent scheduling downlink transmissions for which the UE is to request resources for transmitting the negative acknowledgment feedback to the base station.

Aspect 4: The method of any of aspects 1 through 3, wherein receiving the configuration message indicating that the UE is to request resources for transmitting the negative acknowledgment feedback to the base station comprises: receiving, in the configuration message, an indication of all or a subset of downlink hybrid automatic repeat request identifiers associated with downlink transmissions for which the UE is to request resources for transmitting the negative acknowledgment feedback to the base station.

Aspect 5: The method of any of aspects 1 through 4, wherein receiving the configuration message indicating that the UE is to request resources for transmitting the negative acknowledgment feedback to the base station comprises: receiving, in the configuration message, an indication of one or more downlink control information scheduled downlink transmissions for which the UE is to request resources for transmitting the negative acknowledgment feedback to the base station.

Aspect 6: The method of any of aspects 1 through 5, wherein determining to transmit the negative acknowledgment feedback to the base station for the downlink transmission comprises: determining that an acknowledgment or negative acknowledgment codebook for the downlink transmission comprises at least one negative acknowledgment.

Aspect 7: The method of any of aspects 1 through 6, wherein determining to transmit the negative acknowledgment feedback to the base station for the downlink transmission comprises: determining that an acknowledgment or negative acknowledgment feedback bit for a hybrid automatic repeat request identifier corresponding to the downlink transmission comprises a negative acknowledgment.

Aspect 8: The method of any of aspects 1 through 7, wherein transmitting the request for resources for transmitting the negative acknowledgment feedback comprises: transmitting a scheduling request comprising the request for resources for transmitting the negative acknowledgment feedback.

Aspect 9: The method of any of aspects 1 through 8, wherein transmitting the request for resources for transmitting the negative acknowledgment feedback comprises: transmitting the request for resources for transmitting the negative acknowledgment feedback on an acknowledgment or negative acknowledgment feedback resource for a second downlink transmission.

Aspect 10: The method of any of aspects 1 through 9, wherein transmitting the request for resources for transmitting the negative acknowledgment feedback comprises: transmitting the request for resources for transmitting the negative acknowledgment feedback in uplink control information or a medium access control control element of an existing allocation.

Aspect 11: The method of any of aspects 1 through 10, wherein transmitting the request for resources for transmitting the negative acknowledgment feedback comprises: transmitting the request for resources for transmitting the negative acknowledgment feedback on dedicated resources for the request allocated to the UE or a group of UEs comprising the UE.

Aspect 12: The method of any of aspects 1 through 11, wherein transmitting the request for resources for transmitting the negative acknowledgment feedback comprises: transmitting the request for resources for transmitting the negative acknowledgment feedback on contention-based resources for the request.

Aspect 13: The method of any of aspects 1 through 12, further comprising: receiving an indication of resources or a message in which the UE is to transmit the request for resources for transmitting the negative acknowledgment feedback.

Aspect 14: The method of any of aspects 1 through 13, further comprising: transmitting the negative acknowledgment feedback associated with a corresponding acknowledgment or negative acknowledgment codebook or downlink HARQ identifier containing at least one negative acknowledgment bit to the base station on resources allocated based at least in part on the request for resources.

Aspect 15: The method of any of aspects 1 through 14, wherein the configuration message is received in a radio resource control message, a medium access control control element, or a downlink control information message.

Aspect 16: A method for wireless communication at a base station, comprising: transmitting, to a UE, a configuration message indicating that the UE is to request resources for transmitting the negative acknowledgment feedback to the base station for a downlink transmission; transmitting the downlink transmission to the UE; receiving, from the UE based at least in part on transmitting the configuration message and on transmitting the downlink transmission, a request for resources to be used by the UE to transmit the negative acknowledgment feedback for the downlink transmission; and transmitting, to the UE based at least in part on receiving the request, an indication of resources allocated for transmitting the negative acknowledgment feedback.

Aspect 17: The method of aspect 16, further comprising: receiving the negative acknowledgment feedback from the UE on the indicated resources based at least in part on transmitting the indication of resources.

Aspect 18: The method of any of aspects 16 through 17, wherein transmitting the configuration message indicating that the UE is to request resources for transmitting the negative acknowledgment feedback to the base station comprises: transmitting, in the configuration message, an indication of all or a subset of semi-persistent scheduling downlink transmissions for which the UE is to request resources for transmitting the negative acknowledgment feedback to the base station.

Aspect 19: The method of any of aspects 16 through 18, wherein transmitting the configuration message indicating that the UE is to request resources for transmitting the negative acknowledgment feedback to the base station comprises: transmitting, in the configuration message, an indication of all or a subset of downlink hybrid automatic repeat request identifiers associated with downlink transmissions for which the UE is to request resources for transmitting the negative acknowledgment feedback to the base station.

Aspect 20: The method of any of aspects 16 through 19, wherein transmitting the configuration message indicating that the UE is to request resources for transmitting the negative acknowledgment feedback to the base station comprises: transmitting, in the configuration message, an indication of one or more downlink control information scheduled downlink transmissions for which the UE is to request resources for transmitting the negative acknowledgment feedback to the base station.

Aspect 21: The method of any of aspects 16 through 20, wherein receiving the request for resources to be used by the UE to transmit the negative acknowledgment feedback comprises: receiving a scheduling request comprising the request for resources to be used by the UE to transmit the negative acknowledgment feedback.

Aspect 22: The method of any of aspects 16 through 21, wherein receiving the request for resources to be used by the UE to transmit the negative acknowledgment feedback comprises: receiving the request for resources to be used by the UE to transmit the negative acknowledgment feedback on an acknowledgment or negative acknowledgment feedback resource for a second downlink transmission.

Aspect 23: The method of any of aspects 16 through 22, wherein receiving the request for resources to be used by the UE to transmit the negative acknowledgment feedback comprises: receiving the request for resources to be used by the UE to transmit the negative acknowledgment feedback in uplink control information or a medium access control control element of an existing allocation.

Aspect 24: The method of any of aspects 16 through 23, wherein receiving the request for resources to be used by the UE to transmit the negative acknowledgment feedback comprises: receiving the request for resources to be used by the UE to transmit the negative acknowledgment feedback on dedicated resources for the request allocated to the UE or a group of UEs including the UE.

Aspect 25: The method of any of aspects 16 through 24, wherein receiving the request for resources to be used by the UE to transmit the negative acknowledgment feedback comprises: receiving the request for resources to be used by the UE to transmit the negative acknowledgment feedback on contention-based resources for the request.

Aspect 26: The method of any of aspects 16 through 25, further comprising: transmitting a second indication of resources or a message in which the UE is to transmit the request for resources for transmitting the negative acknowledgment feedback.

Aspect 27: The method of any of aspects 16 through 26, further comprising: receiving the negative acknowledgment feedback associated with a corresponding acknowledgment or negative acknowledgment codebook or downlink hybrid automatic repeat request identifier containing at least one negative acknowledgment bit from the UE on resources allocated based at least in part on the request for resources.

Aspect 28: The method of any of aspects 16 through 27, wherein the configuration message is transmitted in a radio resource control message, a medium access control control element, or a downlink control information message.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a base station, a configuration message indicating that the UE is to request resources for transmitting negative acknowledgment feedback to the base station for a downlink transmission;
attempting to decode the downlink transmission from the base station;
determining to transmit the negative acknowledgment feedback to the base station for the downlink transmission based at least in part on receiving the configuration message and attempting to decode the downlink transmission; and
transmitting, to the base station, a request for resources for transmitting the negative acknowledgment feedback based at least in part on determining to transmit the negative acknowledgment feedback.

2. The method of claim 1, further comprising:
receiving, from the base station, an indication of resources allocated for transmitting the negative acknowledgment feedback based at least in part on transmitting the request for resources; and
transmitting the negative acknowledgment feedback to the base station on the indicated resources.

3. The method of claim 1, wherein receiving the configuration message indicating that the UE is to request resources for transmitting the negative acknowledgment feedback to the base station comprises:
receiving, in the configuration message, an indication of all or a subset of semi-persistent scheduling downlink transmissions for which the UE is to request resources for transmitting the negative acknowledgment feedback to the base station.

4. The method of claim 1, wherein receiving the configuration message indicating that the UE is to request resources for transmitting the negative acknowledgment feedback to the base station comprises:
receiving, in the configuration message, an indication of all or a subset of downlink hybrid automatic repeat request identifiers associated with downlink transmissions for which the UE is to request resources for transmitting the negative acknowledgment feedback to the base station.

5. The method of claim 1, wherein receiving the configuration message indicating that the UE is to request resources for transmitting the negative acknowledgment feedback to the base station comprises:
receiving, in the configuration message, an indication of one or more downlink control information scheduled downlink transmissions for which the UE is to request resources for transmitting the negative acknowledgment feedback to the base station.

6. The method of claim 1, wherein determining to transmit the negative acknowledgment feedback to the base station for the downlink transmission comprises:
determining that an acknowledgment or negative acknowledgment codebook for the downlink transmission comprises at least one negative acknowledgment.

7. The method of claim 1, wherein determining to transmit the negative acknowledgment feedback to the base station for the downlink transmission comprises:
determining that an acknowledgment or negative acknowledgment feedback bit for a hybrid automatic repeat request identifier corresponding to the downlink transmission comprises a negative acknowledgment.

8. The method of claim 1, wherein transmitting the request for resources for transmitting the negative acknowledgment feedback comprises:
transmitting a scheduling request comprising the request for resources for transmitting the negative acknowledgment feedback.

9. The method of claim 1, wherein transmitting the request for resources for transmitting the negative acknowledgment feedback comprises:
transmitting the request for resources for transmitting the negative acknowledgment feedback on an acknowledgment or negative acknowledgment feedback resource for a second downlink transmission.

10. The method of claim 1, wherein transmitting the request for resources for transmitting the negative acknowledgment feedback comprises:
transmitting the request for resources for transmitting the negative acknowledgment feedback in uplink control information or a medium access control control element of an existing allocation.

11. The method of claim 1, wherein transmitting the request for resources for transmitting the negative acknowledgment feedback comprises:
transmitting the request for resources for transmitting the negative acknowledgment feedback on dedicated resources for the request allocated to the UE or a group of UEs comprising the UE.

12. The method of claim 1, wherein transmitting the request for resources for transmitting the negative acknowledgment feedback comprises:
transmitting the request for resources for transmitting the negative acknowledgment feedback on contention-based resources for the request.

13. The method of claim 1, further comprising:
receiving an indication of resources or a message in which the UE is to transmit the request for resources for transmitting the negative acknowledgment feedback.

14. The method of claim 1, further comprising:
transmitting the negative acknowledgment feedback associated with a corresponding acknowledgment or negative acknowledgment codebook or downlink hybrid automatic repeat request identifier containing at least one negative acknowledgment bit to the base station on resources allocated based at least in part on the request for resources.

15. The method of claim 1, wherein the configuration message is received in a radio resource control message, a medium access control control element, or a downlink control information message.

16. A method for wireless communication at a base station, comprising:
transmitting, to a user equipment (UE), a configuration message indicating that the UE is to request resources for transmitting negative acknowledgment feedback to the base station for a downlink transmission;
transmitting the downlink transmission to the UE;
receiving, from the UE based at least in part on transmitting the configuration message and on transmitting the downlink transmission, a request for resources to be used by the UE to transmit the negative acknowledgment feedback for the downlink transmission; and
transmitting, to the UE based at least in part on receiving the request, an indication of resources allocated for transmitting the negative acknowledgment feedback.

17. The method of claim 16, further comprising:
receiving the negative acknowledgment feedback from the UE on the indicated resources based at least in part on transmitting the indication of resources.

18. The method of claim 16, wherein transmitting the configuration message indicating that the UE is to request resources for transmitting the negative acknowledgment feedback to the base station comprises:
transmitting, in the configuration message, an indication of all or a subset of semi-persistent scheduling downlink transmissions for which the UE is to request resources for transmitting the negative acknowledgment feedback to the base station.

19. The method of claim 16, wherein transmitting the configuration message indicating that the UE is to request resources for transmitting the negative acknowledgment feedback to the base station comprises:
transmitting, in the configuration message, an indication of all or a subset of downlink hybrid automatic repeat request identifiers associated with downlink transmissions for which the UE is to request resources for transmitting the negative acknowledgment feedback to the base station.

20. The method of claim 16, wherein transmitting the configuration message indicating that the UE is to request resources for transmitting the negative acknowledgment feedback to the base station comprises:
   transmitting, in the configuration message, an indication of one or more downlink control information scheduled downlink transmissions for which the UE is to request resources for transmitting the negative acknowledgment feedback to the base station.

21. The method of claim 16, wherein receiving the request for resources to be used by the UE to transmit the negative acknowledgment feedback comprises:
   receiving a scheduling request comprising the request for resources to be used by the UE to transmit the negative acknowledgment feedback.

22. The method of claim 16, wherein receiving the request for resources to be used by the UE to transmit the negative acknowledgment feedback comprises:
   receiving the request for resources to be used by the UE to transmit the negative acknowledgment feedback on an acknowledgment or negative acknowledgment feedback resource for a second downlink transmission.

23. The method of claim 16, wherein receiving the request for resources to be used by the UE to transmit the negative acknowledgment feedback comprises:
   receiving the request for resources to be used by the UE to transmit the negative acknowledgment feedback in uplink control information or a medium access control control element of an existing allocation.

24. The method of claim 16, wherein receiving the request for resources to be used by the UE to transmit the negative acknowledgment feedback comprises:
   receiving the request for resources to be used by the UE to transmit the negative acknowledgment feedback on dedicated resources for the request allocated to the UE or a group of UEs including the UE.

25. The method of claim 16, wherein receiving the request for resources to be used by the UE to transmit the negative acknowledgment feedback comprises:
   receiving the request for resources to be used by the UE to transmit the negative acknowledgment feedback on contention-based resources for the request.

26. The method of claim 16, further comprising:
   transmitting a second indication of resources or a message in which the UE is to transmit the request for resources for transmitting the negative acknowledgment feedback.

27. The method of claim 16, further comprising:
   receiving the negative acknowledgment feedback associated with a corresponding acknowledgment or negative acknowledgment codebook or downlink hybrid automatic repeat request identifier containing at least one negative acknowledgment bit from the UE on resources allocated based at least in part on the request for resources.

28. The method of claim 16, wherein the configuration message is transmitted in a radio resource control message, a medium access control control element, or a downlink control information message.

29. An apparatus for wireless communication at a user equipment (UE), comprising:
   a processor;
   a memory coupled with the processor, wherein the memory comprises instructions executable by the processor to cause the apparatus to:
      receive, from a base station, a configuration message indicating that the UE is to request resources for transmitting negative acknowledgment feedback to the base station for a downlink transmission;
      attempt to decode the downlink transmission from the base station;
      determine to transmit the negative acknowledgment feedback to the base station for the downlink transmission based at least in part on receiving the configuration message and attempting to decode the downlink transmission; and
      transmit, to the base station, a request for resources for transmitting the negative acknowledgment feedback based at least in part on determining to transmit the negative acknowledgment feedback.

30. An apparatus for wireless communication at a base station, comprising:
   a processor;
   a memory coupled with the processor, wherein the memory comprises instructions executable by the processor to cause the apparatus to:
      transmit, to a user equipment (UE), a configuration message indicating that the UE is to request resources for transmitting negative acknowledgment feedback to the base station for a downlink transmission;
      transmit the downlink transmission to the UE;
      receive, from the UE based at least in part on transmitting the configuration message and on transmitting the downlink transmission, a request for resources to be used by the UE to transmit the negative acknowledgment feedback for the downlink transmission; and
      transmit, to the UE based at least in part on receiving the request, an indication of resources allocated for transmitting the negative acknowledgment feedback.

* * * * *